United States Patent
Miyahara et al.

(10) Patent No.: US 10,437,189 B2
(45) Date of Patent: Oct. 8, 2019

(54) IMAGE FORMING APPARATUS WITH RE-CONVEYANCE MECHANISM

(71) Applicant: Brother Kogyo Kabushiki Kaisha, Nagoya-shi, Aichi-ken (JP)

(72) Inventors: Kensuke Miyahara, Nagoya (JP); Kunihiko Kondo, Handa (JP); Hotaka Kakutani, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/700,800

(22) Filed: Apr. 30, 2015

(65) Prior Publication Data
US 2015/0317545 A1 Nov. 5, 2015

(30) Foreign Application Priority Data

May 1, 2014 (JP) .................................. 2014-194884

(51) Int. Cl.
*G06K 15/16* (2006.01)
*G03G 15/00* (2006.01)
(Continued)

(52) U.S. Cl.
CPC ........... *G03G 15/234* (2013.01); *G06K 15/00* (2013.01); *G06K 15/16* (2013.01);
(Continued)

(58) Field of Classification Search
CPC ............ G03G 15/1615; G03G 15/235; G03G 15/2039; G03G 21/1647; G03G 15/234;
(Continued)

(56) References Cited

U.S. PATENT DOCUMENTS

| 4,772,914 A | 9/1988 | Kinoshita et al. |
| 5,081,508 A | 1/1992 | Kotani et al. |

(Continued)

FOREIGN PATENT DOCUMENTS

| JP | S62-201470 A | 9/1987 |
| JP | H04-333070 A | 11/1992 |

(Continued)

OTHER PUBLICATIONS

English Machine Translation of JP 2008-145849 A (Kamoshita et. al, Published Jun. 26, 2008).*

(Continued)

*Primary Examiner* — Benny Q Tieu
*Assistant Examiner* — Juan M Guillermety
(74) *Attorney, Agent, or Firm* — Banner & Witcoff, Ltd.

(57) ABSTRACT

An image forming apparatus is provided with: an image forming unit having a photosensitive member, a charger, and a developer carrier, the image forming unit being configured to transfer the developer image to a recording sheet to form an image on the recording sheet; a motor configured to drive the photosensitive member and the developer carrier; a controller configured to control the motor and the charger, and a re-conveyance mechanism configured to reverse the recording sheet discharged from the image forming unit and to convey the recording sheet back towards the image forming unit. The controller is configured to turn off the charger after the motor is turned off, during a time period after the recording sheet is discharged from the image forming unit until the recording sheet is re-conveyed to the image forming unit by the re-conveyance mechanism.

9 Claims, 14 Drawing Sheets

(51) Int. Cl.
  *G03G 15/23* (2006.01)
  *G06K 15/00* (2006.01)
  *G06K 15/02* (2006.01)

(52) U.S. Cl.
  CPC ..... *G06K 15/1805* (2013.01); *G06K 15/4055* (2013.01); *G03G 2215/00438* (2013.01); *G03G 2215/00586* (2013.01); *G03G 2215/0141* (2013.01)

(58) Field of Classification Search
  CPC ....... G03G 15/0194; G03G 2221/1657; G03G 2215/00438; G03G 2215/00586; G03G 2215/0141; B41J 13/60; B41J 13/0045; G06K 15/16; G06K 15/4055; G06K 15/1805
  USPC ........... 358/1.12; 399/67, 70, 381, 388, 401, 399/167, 395
  See application file for complete search history.

(56) References Cited

U.S. PATENT DOCUMENTS

| | | | | |
|---|---|---|---|---|
| 5,274,402 A * | 12/1993 | Serizawa | ............... | G06K 15/16 399/151 |
| 5,455,603 A * | 10/1995 | Hori | ....................... | G06K 15/16 358/1.12 |
| 5,768,665 A * | 6/1998 | Yamanaka | .......... | G03G 15/065 399/55 |
| 5,805,954 A * | 9/1998 | Takahashi | ......... | G03G 15/0266 399/44 |
| 5,819,149 A * | 10/1998 | Watanabe | .......... | G03G 15/5008 399/44 |
| 6,389,243 B2 | 5/2002 | Makino | | |
| 6,567,623 B2 * | 5/2003 | Kobayashi | ......... | G03G 15/5004 399/170 |
| 6,885,834 B2 | 4/2005 | Ito et al. | | |
| 2002/0098013 A1 | 7/2002 | Kamimura | | |
| 2003/0129009 A1 * | 7/2003 | Matsuyama | ....... | G03G 15/6538 399/401 |
| 2003/0170048 A1 | 9/2003 | Ahn | | |
| 2004/0005159 A1 * | 1/2004 | Ito | ......................... | G03G 15/55 399/50 |
| 2004/0022551 A1 | 2/2004 | Ito et al. | | |
| 2004/0052547 A1 | 3/2004 | Matsuura et al. | | |
| 2004/0126124 A1 * | 7/2004 | Inoue | ..................... | G03G 15/50 399/44 |
| 2004/0264986 A1 * | 12/2004 | Sasai | ...................... | G03G 15/50 399/44 |
| 2004/0264989 A1 * | 12/2004 | Sasai | ................. | G03G 21/0064 399/55 |
| 2006/0083527 A1 * | 4/2006 | Sakamaki | .......... | G03G 15/0121 399/50 |
| 2008/0118274 A1 | 5/2008 | Ahn et al. | | |
| 2009/0003858 A1 * | 1/2009 | Nishida | .............. | G03G 15/5037 399/346 |
| 2009/0035041 A1 | 2/2009 | Yang | | |
| 2009/0060568 A1 | 3/2009 | Ishikawa et al. | | |
| 2009/0180808 A1 | 7/2009 | Hyun-ho | | |
| 2009/0280428 A1 * | 11/2009 | Matsuo | .............. | G03G 15/2039 399/44 |
| 2009/0297182 A1 * | 12/2009 | Kinukawa | ......... | G03G 15/0266 399/43 |
| 2010/0150633 A1 * | 6/2010 | Tanaka | ................. | G03G 15/234 399/395 |
| 2010/0209157 A1 * | 8/2010 | Sato | ................... | G03G 21/0058 399/343 |
| 2010/0247193 A1 * | 9/2010 | Suzuki | ................ | G03G 15/234 399/364 |
| 2011/0129240 A1 * | 6/2011 | Uno | .................... | G03G 15/0806 399/257 |
| 2011/0176832 A1 * | 7/2011 | Mase | .................... | G03G 15/234 399/167 |
| 2011/0188061 A1 * | 8/2011 | Miyamoto | ............. | G06K 15/16 358/1.12 |
| 2011/0211003 A1 * | 9/2011 | Kusakabe | .................. | B41J 3/60 347/14 |
| 2011/0318078 A1 * | 12/2011 | Aoi | ...................... | G03G 15/235 399/381 |
| 2013/0028632 A1 * | 1/2013 | Sato | ................... | G03G 15/0126 399/110 |
| 2013/0168921 A1 | 7/2013 | Suzuki et al. | | |
| 2013/0209121 A1 * | 8/2013 | Uchitani | ............. | G03G 15/205 399/67 |
| 2013/0209131 A1 * | 8/2013 | Uchitani | ............. | G03G 15/205 399/70 |
| 2014/0016957 A1 | 1/2014 | Suzuki et al. | | |
| 2014/0016979 A1 | 1/2014 | Suzuki et al. | | |
| 2014/0020489 A1 * | 1/2014 | Nozaki | .............. | G03G 21/1647 74/404 |
| 2015/0277261 A1 * | 10/2015 | Suzuki | ................ | G03G 15/234 399/228 |
| 2015/0277279 A1 * | 10/2015 | Suzuki | ................ | G03G 15/234 399/53 |

FOREIGN PATENT DOCUMENTS

| | | |
|---|---|---|
| JP | H11-327407 A | 11/1999 |
| JP | 2004-062107 A | 2/2004 |
| JP | 2004-258185 A | 9/2004 |
| JP | 3620993 B2 | 2/2005 |
| JP | 2006-290526 A | 10/2006 |
| JP | 2006-293294 A | 10/2006 |
| JP | 2012-118470 A | 6/2012 |
| JP | 2013-137378 A | 7/2013 |
| JP | 2014-021194 A | 2/2014 |

OTHER PUBLICATIONS

Translated Abstract of JP-63127995, Miyabe, Published Nov. 30, 1989.*
Aug. 24, 2015—U.S. Office Action—U.S. Appl. No. 14/664,412.
Jan. 11, 2016—U.S. Office Action—U.S. Appl. No. 14/664,455.
Nov. 7, 2017—(JP) Reasons for Rejection—App 2014-070359.
Nov. 14, 2017—(JP) Reasons for Rejection—App 2014-070359.
Dec. 26, 2017—(JP) Reasons for Rejection—App 2014-094884.

* cited by examiner

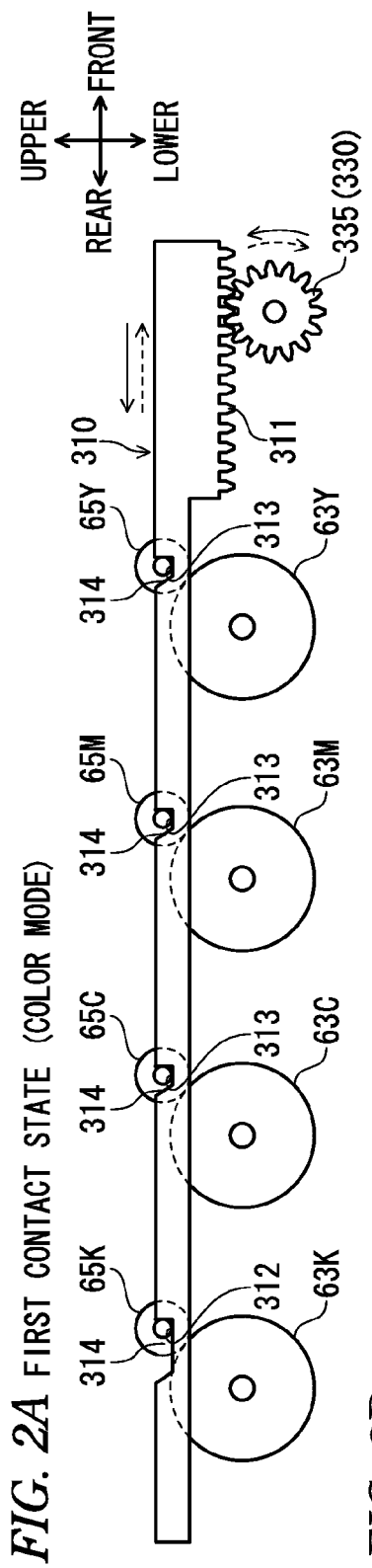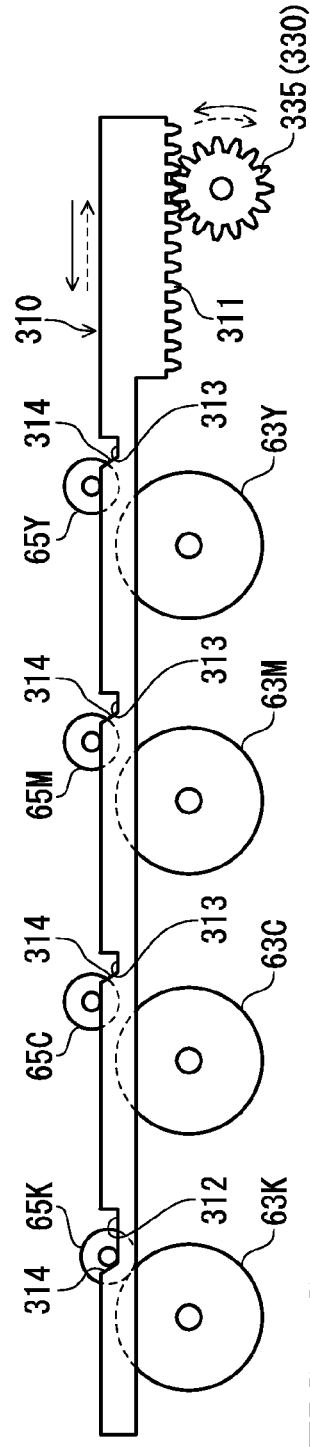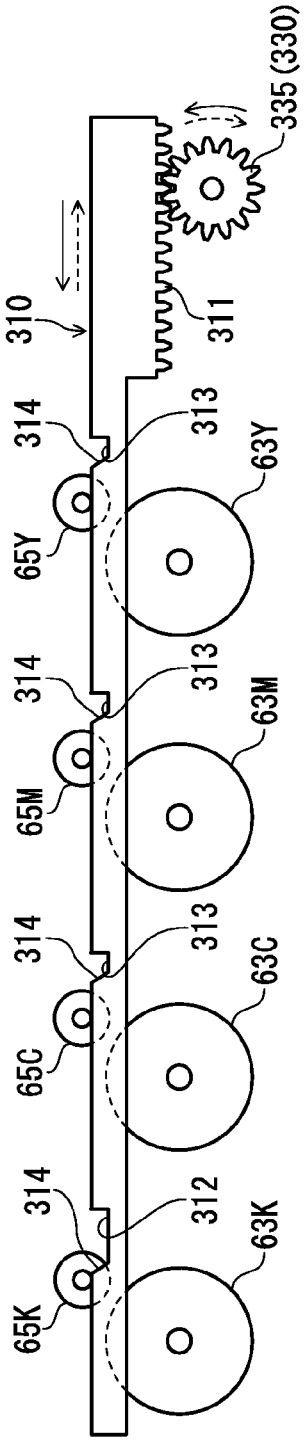
FIG. 2A FIRST CONTACT STATE (COLOR MODE)
FIG. 2B SECOND CONTACT STATE (MONOCHROME MODE)
FIG. 2C SEPARATION STATE

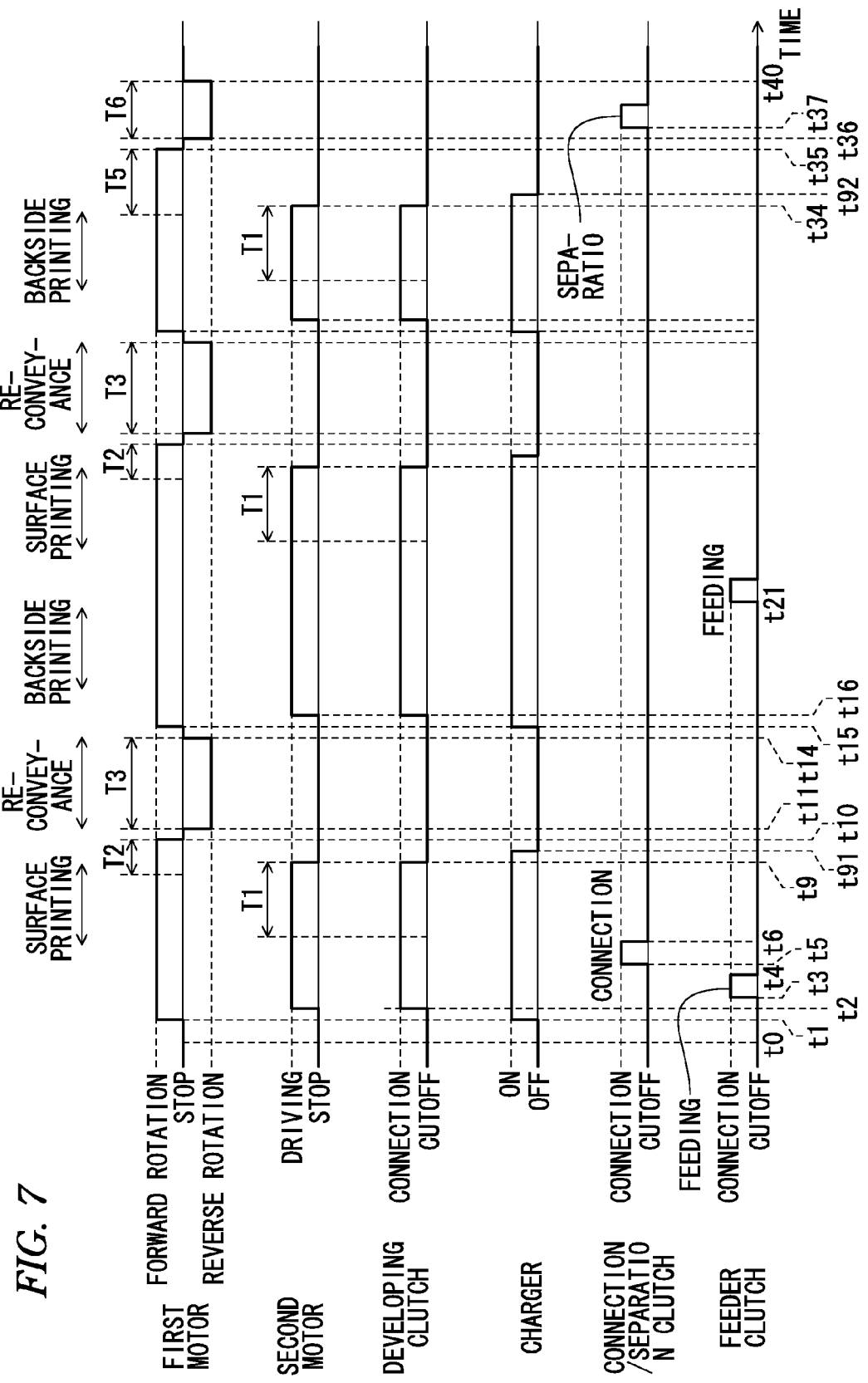

IMAGE FORMING APPARATUS WITH RE-CONVEYANCE MECHANISM

CROSS-REFERENCE TO RELATED APPLICATION

This application claims priorities from Japanese Patent Application No. 2014-094884 filed on May 1, 2014, the entire subject matters of which is incorporated herein by reference.

TECHNICAL FIELD

The present disclosure relates to an image forming apparatus capable of performing a duplex printing.

BACKGROUND

An example of an image forming apparatus, such as a printer, which is capable of performing a duplex printing is disclosed in JP-A-2014-021194. In the image forming apparatus disclosed in this publication, a recording sheet having an image formed on a surface is discharged from an image forming unit, and thereafter, the recording sheet is reversed and re-conveyed to the image forming unit.

In the image forming apparatus of the related art, since a photosensitive drum and a developing roller are operating during the re-conveyance of the recording sheet, components of the image forming apparatus such as the photosensitive drum may be deteriorated.

SUMMARY

The present disclosure has been made in view of the above circumstances, and one of objects of the present disclosure is to provide an image forming apparatus capable of prolonging lifetime of a photosensitive drum (photosensitive member) and a developing roller (developer carrier).

According to an illustrative embodiment of the present disclosure, there is provided an image forming apparatus including: an image forming unit including a photosensitive member configured to rotate, a charger configured to charge a surface of the photosensitive member, and a developer carrier configured to rotate and supply developer to an electrostatic latent image formed on the photosensitive member to form a developer image, the image forming unit being configured to transfer the developer image to a recording sheet to form an image on the recording sheet; a motor configured to drive the photosensitive member and the developer carrier; a controller configured to control the motor and the charger; and a re-conveyance mechanism configured to reverse the recording sheet discharged from the image forming unit and to convey the recording sheet back towards the image forming unit. The controller is configured to turn off the charger after the motor is turned off, during a time period after the recording sheet is discharged from the image forming unit until the recording sheet is re-conveyed to the image forming unit by the re-conveyance mechanism.

According to another illustrative embodiment of the present disclosure, there is provided an image forming apparatus including: an image forming unit including: a photosensitive drum; charger configured to charge a surface of the photosensitive drum; and a developer configured to supply toner to a latent image formed on the photosensitive drum; a motor configured to drive the photosensitive drum and the developer; a re-conveyance unit configured to reverse a recording sheet discharged from the image forming unit and to convey the recording sheet towards the image forming unit; and a controller. The controller is configured to: receive a duplex printing job including image data to be formed; rotate the motor in response to receiving the duplex printing job; control the image forming unit to form an image on a first surface of a sheet; stop the motor, during a time period after the recording sheet is discharged from the image forming unit until the recording sheet is re-conveyed to the image forming unit by the re-conveyance unit; rotate the motor, when the re-conveyance unit starts to convey the recording sheet towards the image forming unit, after the motor is stopped; and control the image forming unit to form an image on a second surface of the sheet, wherein the second surface of the sheet is opposite to the first surface of the sheet.

According to still another illustrative embodiment of the present disclosure, there is provided an image forming apparatus including: an image forming unit including: plurality of photosensitive drums; plurality of chargers configured to charge a surface of the photosensitive drum; and plurality of developers configured to supply toner to a latent image formed on the photosensitive drum; a re-conveyance unit configured to reverse a recording sheet discharged from the image forming unit and to convey the recording sheet towards the image forming unit; a first motor configured to drive one of the developer and the re-conveyance unit; a second motor configured to drive all of the photosensitive drums and the other of the developer; a cam configured to be formed with recess portions, the recess portion being configured to engage with a rotary shaft of the developer and to have an inclined surface extending from a bottom of the recess portion towards an upper of the recess portion; a gear configured to contact with the cam, wherein the cam is moved in a predetermined direction in response to the gear rotating in a first direction and is moved in an opposite direction of the predetermined direction in response to the gear rotating in a second direction opposite the first direction, wherein the predetermined direction is a direction in which the rotary shaft of the developer contacts with the inclined surface; and controller. The controller is configured to: receive a duplex printing job including image data to be formed; rotate the first motor and the second motor in response to receiving the duplex printing job; control the image forming unit to form an image on a first surface of a sheet; stop the second motor, during a time period after the recording sheet is discharged from the image forming unit until the recording sheet is re-conveyed to the image forming unit by the re-conveyance unit; rotate the gear in the first direction in accordance with stopping the second motor; rotate the second motor, when the re-conveyance unit starts to convey the recording sheet towards the image forming unit, after the motor is stopped; rotate the gear in opposite direction of the first direction in accordance with rotating the second motor; and control the image forming unit to form an image on a second surface of the sheet, wherein the second surface of the sheet is opposite to the first surface of the sheet.

BRIEF DESCRIPTION OF THE DRAWINGS

In the accompanying drawings:

FIGS. 2A to 2C illustrate a switching mechanism, in which FIG. 2A illustrates a first contact state, FIG. 2B illustrates a second contact state, and FIG. 2C illustrates a separation state;

FIG. 7 is a timing chart showing operational statuses of a first motor, a second motor, a developing clutch, a charger, a clutch and a feeder clutch;

FIGS. 8A to 8C illustrate states of a surface potential of a photosensitive drum when the charger is set to OFF earlier than the second motor and the like;

DETAILED DESCRIPTION

Figure 1:
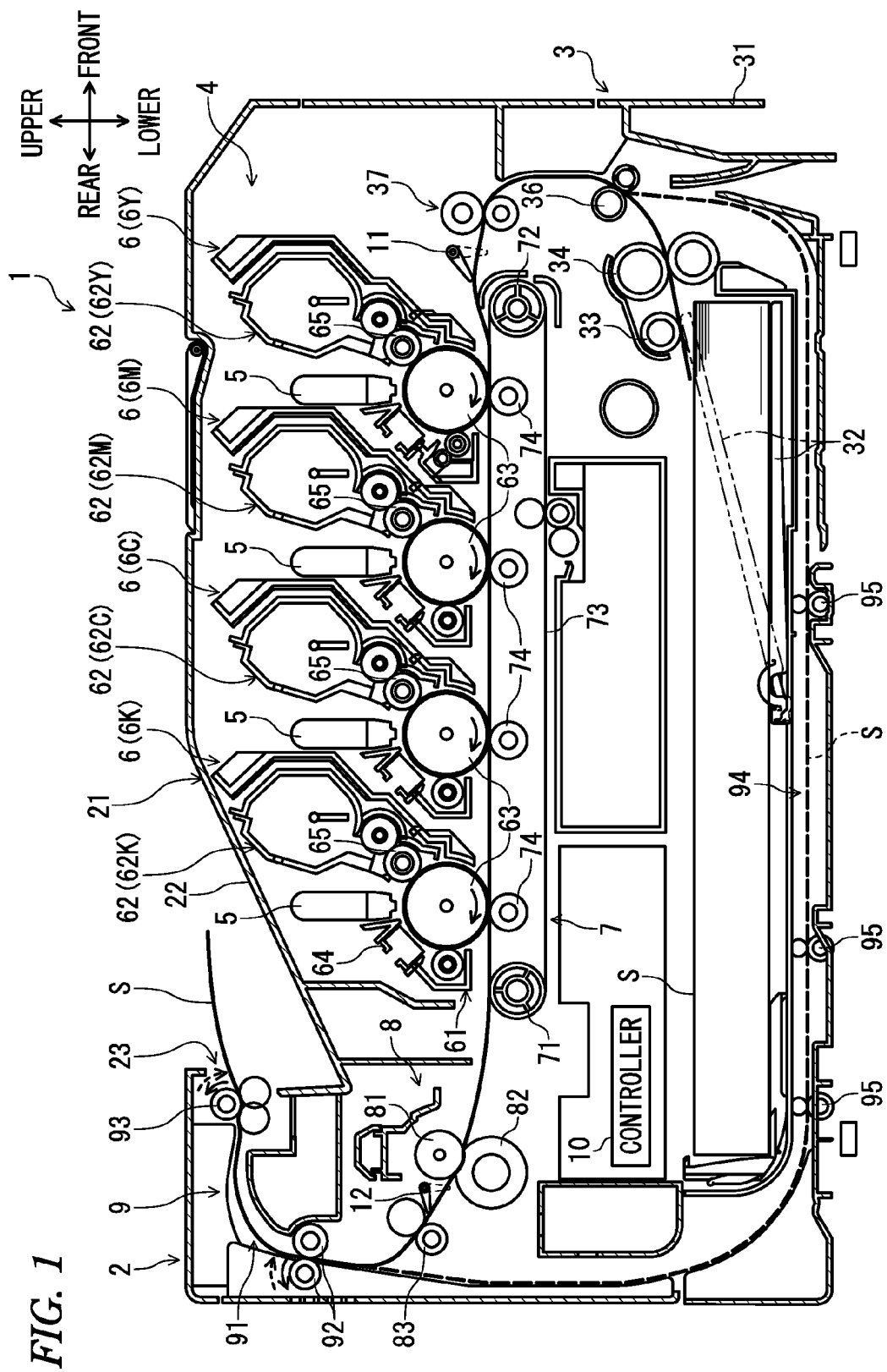
FIG. 1 illustrates a schematic configuration of an image forming apparatus according to an embodiment of the present disclosure.

Hereinafter, an illustrative embodiment according to the present disclosure will be described in detail with reference to the drawings. In the following description, directions are described with respect to a user who uses an image forming apparatus. Specifically, a right side of FIG. 1, which is a front side as seen from a user, is referred to as a 'front', a left side of FIG. 1, which is an inner side as seen from the user, is referred to as a 'rear', a front side of the drawing sheet of FIG. 1 is referred to as 'left' and an inner side of the drawing sheet is referred to as 'right'. Also, an upper-lower direction of FIG. 1 is referred to as 'upper and lower'.

As shown in FIG. 1, a color printer 1, which is an example of the image forming apparatus, is configured to form images on both faces of a sheet S, which is an example of the recording sheet. The color printer 1 is provided with a housing 2, and a feeder unit 3, an image forming unit 4, a fixing unit 8 and a conveyance unit 9, which are arranged in the housing 2.

The housing 2 is provided with an upper cover 21 configured to rotate in the upper-lower direction about a rotary shaft (not shown) provided at a rear side thereof and to be thus opened and closed, a sheet discharge tray 22 on which the sheet S having an image formed thereon is placed, and a discharge opening 23 for discharging the sheet S to the sheet discharge tray 22.

The feeder unit 3 is provided at a lower part in the housing 2, and is provided with a sheet feeding tray 31 configured to accommodate therein sheets S, a sheet pressing plate 32, a feeder roller 33, separation rollers 34, conveyance rollers 36, and registration rollers 37. The feeder unit 3 is configured to incline the sheets S in the sheet feeding tray 31 towards the feeder roller 33 by the sheet pressing plate 32 and to deliver the sheet S from the sheet feeding tray 31 towards the image forming unit 4 by the feeder roller 33. Then, the feeder unit 3 is configured to separate the sheets S delivered from the sheet feeding tray 31 one by one by the separation rollers 34 and to feed the same to the image forming unit 4 by the conveyance rollers 36 and the registration rollers 37.

The image forming unit 4 is configured to transfer a toner image, which is an example of the developer image, onto the sheet S and to form an image thereon, and is provided with four LED units 5, four process units 6, and a transfer unit 7.

The LED unit 5 is arranged above a photosensitive drum 63 to face the same, and has a plurality of LEDs (Light Emitting Diodes) (not shown) at a lower end thereof, which are arranged in a left-right direction. The LEDs are blinked, based on image data, so that the LED unit 5 exposes a surface of the photosensitive drum 63. The LED unit 5 is held at the upper cover 21 by a holding member (not shown). When the upper cover 21 is opened, the LED unit 5 is moved together with the upper cover 21 and is thus spaced from the photosensitive drum 63.

The process units 6 are arranged side by side in a front-rear direction between the sheet discharge tray 22 and the sheet feeding tray 31, and can be mounted or demounted to or from the housing 2 with the upper cover 21 being opened. Each process unit 6 has a drum cartridge 61 and a developing cartridge 62 configured to be detachably mounted to the drum cartridge 61. Each drum cartridge 61 has the photosensitive drum 63, which is an example of the photosensitive member, a charger 64, and the like. Each developing cartridge 62 has a developing roller 65, which is an example of the developer carrier, and a supply roller, a layer thickness regulation blade, a toner accommodation part configured to accommodate therein toner that is an example of the developer, and the like whose reference numerals are omitted. The developing rollers 65 may also be referred to as developers.

The process units 6 are configured so that the process units 6Y, 6M, 6C, 6K, in which toners of respective colors of yellow, magenta, cyan and black are accommodated, are arranged side by side from the front side in corresponding order. Hereinafter, in the specification and drawings, when specifying the developing cartridges 62, the photosensitive drums 63 and the like corresponding to the toner colors, the reference numerals Y, M, C and K are attached in correspondence to yellow, magenta, cyan and black, respectively.

The transfer unit 7 is provided between the sheet feeding tray 31 and the process units 6, and is provided with a driving roller 71, a driven roller 72, an endless conveyance belt 73, and four transfer rollers 74. The conveyance belt 73 extends with being tensioned between the driving roller 71 and the driven roller 72 and has an outer surface arranged to face the four photosensitive drums 63. At an inner side of the conveyance belt 73, the transfer rollers 74 are arranged to sandwich the conveyance belt 73 between the transfer rollers 74 and the corresponding photosensitive drums 63.

In the image forming unit 4, the surface of the photosensitive drum 63 being rotated is uniformly charged by the charger 64 and is then exposed by the LED unit 5, so that an electrostatic latent image based on the image data is formed on the photosensitive drum 63. The toner in the toner accommodation part is supplied from the supply roller to the developing roller 65, is regulated to have a predetermined thickness between the developing roller 65 and the layer thickness regulation blade by rotation of the developing roller 65, and is then carried on the developing roller 65.

Then, the toner carried on the developing roller 65 is supplied to the photosensitive drum 63, so that the electrostatic latent image becomes visible and a toner image is thus formed on the photosensitive drum 63. After that, the sheet S fed from the feeder unit 3 is conveyed between the photosensitive drums 63 and the conveyance belt 73, so that the toner images on the photosensitive drums 63 are transferred to the sheet S.

The fixing unit 8 is provided at the rear of the process units 6 and transfer unit 7, and is provided with a heating roller 81 and a pressing roller 82 arranged to face the heating roller 81 and configured to press the heating roller 81.

The sheet S having the toner images transferred thereto is conveyed between the heating roller 81 and the pressing roller 82, so that the fixing unit 8 heat-fixes the toner images on the sheet S. The sheet S having the toner images heat-fixed thereon is conveyed out of the fixing device 8 to a conveyance path 91 by convey-out rollers 83.

The conveyance unit 9 is configured to convey the sheet S, which is conveyed out of the image forming unit 4, towards an outside of the housing 2 or again towards the image forming unit 4, and is provided with the conveyance path 91, conveyance rollers 92, discharge rollers 93, a re-conveyance path 94 and a plurality of re-conveyance rollers 95 provided on the re-conveyance path 94. Here, in this illustrative embodiment, the re-conveyance mechanism (re-conveyance unit) is configured by at least the conveyance rollers 92, the discharge rollers 93, the re-conveyance path 94, the re-conveyance rollers 95, the conveyance rollers 36, and the registration rollers 37.

The conveyance path 91 extends upwardly from the vicinity of the convey-out rollers 83 and is then curved forwards to face towards the discharge opening 23. The re-conveyance path 94 extends downwardly from the vicinity of the rear of the convey-out rollers 83, is curved forwards, extends forwards along the lower of the sheet feeding tray 31, is curved upwardly and then extends towards the conveyance rollers 36.

The conveyance rollers 92 and the discharge rollers 93 are switchback rollers configured to be rotatable in forward and reverse directions. Specifically, upon forward rotation indicated by the solid arrow, the conveyance rollers 92 and the discharge rollers 93 are configured to convey the sheet S from the image forming unit 4 towards the discharge opening 23, and upon reverse rotation indicated by the dotted arrow, the conveyance rollers 92 and the discharge rollers 93 are configured to again convey the sheet S conveyed out of the image forming unit 4 towards the image forming unit 4.

When forming an image on only one surface of the sheet S, the conveyance unit 9 conveys the sheet S conveyed out of the image forming unit 4 by the convey-out rollers 83 towards the discharge opening 23 by the conveyance rollers 92 and the discharge rollers 93 being rotating in the forward direction and discharges the sheet S onto the sheet discharge tray 22 through the discharge opening 23.

On the other hand, when forming images on both faces of the sheet S, the conveyance unit 9 conveys the sheet S conveyed out of the image forming unit 4 by the convey-out rollers 83 towards the discharge opening 23 by the conveyance rollers 92 and the discharge rollers 93 being rotating in the forward direction, once stops the conveyance rollers 92 and the discharge rollers 93 at timing before a rear end of the sheet S exits between the conveyance rollers 92, and then rotates the conveyance rollers 92 and the discharge rollers 93 in the reverse direction. Thereby, the sheet S having the image formed on the one surface is guided to the re-conveyance path 94. Then, the sheet S (refer to the broken line) guided to the re-conveyance path 94 is again fed to the image forming unit 4 by the re-conveyance rollers 95, the conveyance rollers 36 and the registration rollers 37.

The sheet S again fed to the image forming unit 4 is formed on the other surface thereof with an image in the image forming unit 4, the image is heat-fixed on the other surface of the sheet in the fixing unit 8 and then the sheet S is conveyed out of the fixing unit 8 by the convey-out rollers 83. Then, the conveyance unit 9 conveys the sheet S conveyed out of fixing unit 8 by the convey-out rollers 83 towards the discharge opening 23 by the conveyance rollers 92 and the discharge rollers 93 being rotating in the forward direction and discharges the same onto the sheet discharge tray 22 through the discharge opening 23.

The color printer 1 is configured to operate in a monochrome mode in which a monochrome image is formed on the sheet S using only the process unit 6K and in a color mode in which a color image is formed on the sheet S using all the process units 6Y, 6M, 6C, 6K.

When operating in the color mode, a first contact state where all the developing rollers 65Y, 65M, 65C, 65K and the corresponding photosensitive drums 63Y, 63M, 63C, 63K are contacted to each other is made, as shown in FIG. 2A. On the other hand, when operating in the monochrome mode, a second contact state where the developing roller 65K and the corresponding photosensitive drum 63K are contacted to each other and the developing rollers 65Y, 65M, 65C and the corresponding photosensitive drums 63Y, 63M, 63C are spaced from each other is made, as shown in FIG. 2B.

The color printer 1 becomes at a separation state where all the developing rollers 65Y, 65M, 65C, 65K and the corresponding photosensitive drums 63Y, 63M, 63C, 63K are spaced from each other when the image formation is over, as shown in FIG. 2C.

Subsequently, a configuration of a driving mechanism of the color printer 1 is described.

Figure 3:
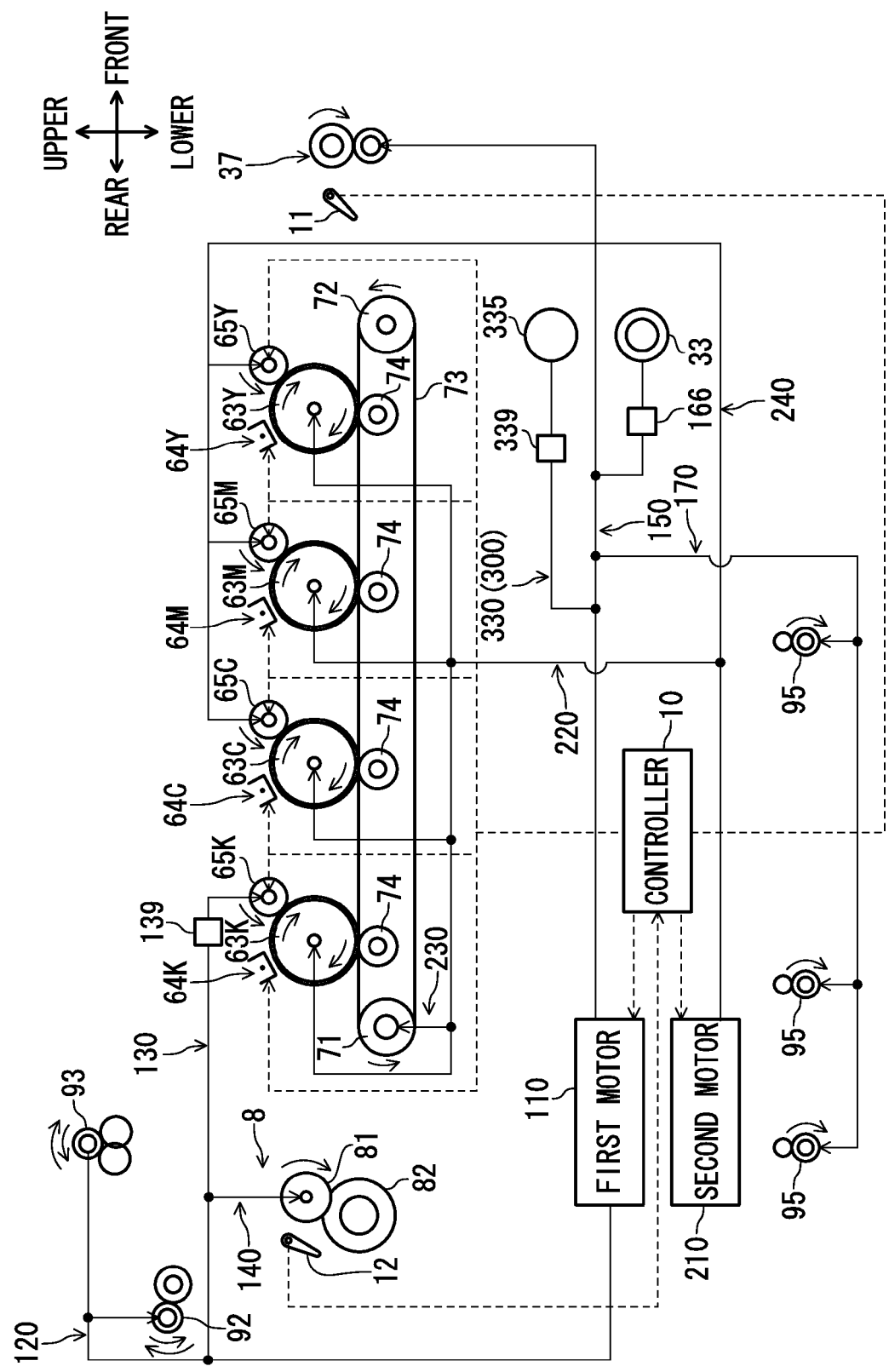
FIG. 3 illustrates a driving mechanism of the image forming apparatus.

As shown in FIG. 3, the color printer 1 has a first motor 110, a second motor 210, a switchback driving mechanism 120, a first developing driving mechanism 130, a fixing driving mechanism 140, a feeder driving mechanism 150, a re-conveyance driving mechanism 170, a photosensitive member driving mechanism 220, a belt driving mechanism 230, a second developing driving mechanism 240 and a switching mechanism 300.

The first motor 110 is a motor for applying a driving force to the developing roller 65K (developing cartridge 62K) configured to supply the black toner to the photosensitive drum 63K, the conveyance rollers 92, the discharge rollers 93, and the like. The first motor 110 is configured to switch a rotating direction of an output shaft (not shown) of the driving force, and to switch the rotating direction of the output shaft, thereby rotating the conveyance rollers 92 and the discharge rollers 93 in the forward or reverse direction.

The second motor 210 is a motor for applying the driving force to the photosensitive drums 63Y, 63M, 63C, 63K, the developing rollers 65Y, 65M, 65C (developing cartridges 62Y, 62M, 62C) configured to supply the yellow, magenta and cyan toners to the photosensitive drums 63Y, 63M, 63C, the conveyance belt 73, and the like. When the second motor 210 is driven, the output shaft of the driving force is always rotated in the same direction.

The switchback driving mechanism 120 is a mechanism for transmitting the driving force of the first motor 110 to the conveyance rollers 92 and the discharge rollers 93. The switchback driving mechanism 120 is configured by a plurality of gears (not shown). The switchback driving mechanism 120 is configured to rotate the conveyance rollers 92 and the discharge rollers 93 in the forward direction when the output shaft of the first motor 110 is rotated in one direction (hereinafter, referred to as forward rotation) and to rotate the conveyance rollers 92 and the discharge rollers 93 in the reverse direction when the output shaft of the first motor 110 is rotated in an opposite direction (hereinafter, referred to as reverse rotation) to the one direction. In the meantime, since the well-known configurations can be adopted as regards the specific configurations and arrangements of the gears, the illustrations and descriptions of the specific configurations of the respective driving mechanisms are here omitted.

The first developing driving mechanism 130 is a mechanism for transmitting the driving force of the first motor 110 to the developing roller 65K (developing cartridge 62K). The first developing driving mechanism 130 is configured to have a plurality of gears and is configured to rotate the developing roller 65K in a shown counterclockwise direction, irrespective of the rotating direction of the output shaft of the first motor 110. The first developing driving mechanism 130 has a developing clutch 139. The developing clutch 139 is an electromagnetic clutch having a well-known configuration, and is configured to switch a connection state where the driving force from the first motor 110 can be transmitted to the developing roller 65K and a cutoff state where the driving force from the first motor 110 cannot be transmitted to the developing roller 65K. Here, in this illustrative embodiment, a driving source for driving the developing roller 65K is configured by the first motor 110 and the first developing driving mechanism 130 (particularly, the developing clutch 139).

The fixing driving mechanism 140 is a mechanism for transmitting the driving force of the first motor 110 to the heating roller 81. The fixing driving mechanism 140 is configured by a plurality of gears (not shown), and is configured to rotate the heating roller 81 in the shown clockwise direction when the output shaft of the first motor 110 is rotated in the forward direction and not to transmit the driving force to the heating roller 81 when the output shaft of the first motor 110 is rotated in the reverse direction.

The feeder driving mechanism 150 is a mechanism for transmitting the driving force of the first motor 110 to the feeder roller 33, the registration rollers 37 and the like (the feeder unit 3). The feeder driving mechanism 150 is configured to have a plurality of gears, and is configured to rotate the feeder roller 33 and the like in the same direction, irrespective of the rotating direction of the output shaft of the first motor 110. The feeder driving mechanism 150 has a feeder clutch 166. The feeder clutch 166 is an electromagnetic clutch having a well-known configuration, and is configured to switch a connection state where the driving force from the first motor 110 can be transmitted to the feeder roller 33 and a cutoff state where the driving force from the first motor 110 cannot be transmitted to the feeder roller 33.

The re-conveyance driving mechanism 170 is a mechanism for transmitting the driving force of the first motor 110 to the re-conveyance rollers 95. The re-conveyance driving mechanism 170 is configured to have a plurality of gears, and is configured to rotate the re-conveyance rollers 95 in the shown clockwise direction, irrespective of the rotating direction of the output shaft of the first motor 110.

The photosensitive member driving mechanism 220 is a mechanism for transmitting the driving force of the second motor 210 to the photosensitive drums 63Y, 63M, 63C, 63K. The photosensitive member driving mechanism 220 is configured by a plurality of gears (not shown), and is configured to rotate the photosensitive drum 63Y, 63M, 63C, 63K in the shown clockwise direction when the second motor 210 is driven, and to stop the driving of the photosensitive drums 63Y, 63M, 63C, 63K when the driving of the second motor 210 is stopped. Here, in this illustrative embodiment, a driving source for driving the photosensitive drum 63 is configured by the second motor 210.

The belt driving mechanism 230 is a mechanism for transmitting the driving force of the second motor 210 to the driving roller 71 (transfer unit 7). The belt driving mechanism 230 is configured by a plurality of gears (not shown), and is configured to rotate the driving roller 71 in the shown counterclockwise direction when the second motor 210 is driven, and to stop the driving of the driving roller 71 when the driving of the second motor 210 is stopped.

The second developing driving mechanism 240 is a mechanism for transmitting the driving force of the second motor 210 to the developing rollers 65Y, 65M, 65C (developing cartridges 62Y, 62M, 62C). The second developing driving mechanism 240 is configured to have a plurality of gears (not shown), and is configured to transmit the driving force of the second motor 210 to the developing roller 65Y, 65M, 65C at the first contact state shown in FIG. 2A and not to transmit the driving force of the second motor 210 to the developing roller 65Y, 65M, 65C at the second contact state shown in FIG. 2B or at the separation state shown in FIG. 2C. Here, in this illustrative embodiment, a driving source for driving the developing rollers 65Y, 65M, 65C is configured by the second motor 210.

As shown in FIG. 2, the switching mechanism 300 is configured to switch the first contact state shown in FIG. 2A, the second contact state shown in FIG. 2B and the separation state shown in FIG. 2C, and is provided with a switching cam 310 and a cam driving mechanism 330.

The switching cam 310 is a substantially plate-shaped member provided at a side of the process unit 6 and long in the front-rear direction, and is supported to the housing 2 so that it can move in the front-rear direction. An upper surface of the switching cam 310 is formed with one recess portion 312 engageable with the rotary shaft (a reference numeral thereof is omitted) of the developing roller 65K, three recess portions 313 engageable with the rotary shafts of the developing roller 65Y, 65M, 65C, and inclined surfaces 314 inclined at an upward gradient from front towards rear in a direction facing from rear sides of bottoms of the recess portions 312, 313 towards the upper surface of the switching cam 310. The recess portion 312 is formed to be longer than the recess portions 313 in the front-rear direction.

The cam driving mechanism 330 is a mechanism for transmitting the driving force of the first motor 110 to the switching cam 310. As shown in FIG. 3, the cam driving mechanism 330 has a plurality of gears including a switching cam driving gear 335, and a clutch 339. The clutch 339 is an electromagnetic clutch having a well-known configuration, and is configured to switch a connection state where the driving force from the first motor 110 can be transmitted to the switching cam driving gear 335 and a cutoff state where the driving force from the first motor 110 cannot be transmitted to the switching cam driving gear 335. At the connection state of the clutch 339, the cam driving mechanism 330 is configured to rotate the switching cam driving gear 335 in the counterclockwise direction of FIG. 2 when the output shaft of the first motor 110 is rotated in the forward direction and to rotate the switching cam driving gear 335 in the clockwise direction of FIG. 2 when the output shaft of the first motor 110 is rotated in the reverse direction.

As shown in FIG. 2A, when the first motor 110 is rotated in the reverse direction and the switching cam driving gear 335 is thus rotated in the shown clockwise direction from the first contact state where all the developing rollers 65 and the photosensitive drums 63 are contacted to each other, the switching cam 310 is moved forwards. As a result, the rotary shafts of the developing rollers 65Y, 65M, 65C of the rotary shafts of the four developing rollers 65 engaged with the recess portions 312, 313 are first moved upwardly along the inclined surfaces 314, so that the developing rollers 65Y, 65M, 65C are spaced from the corresponding photosensitive drum 63Y, 63M, 63C, as shown in FIG. 2B. When the switching cam 310 is stopped at this stage, the second contact state where only the developing roller 65K and photosensitive drum 63K are contacted to each other is made. Also, when the switching cam driving gear 335 is rotated in the clockwise direction from the state shown in FIG. 2B, the switching cam 310 is moved more forwards. As a result, as shown in FIG. 2C, the rotary shaft of the developing roller 65K is moved upwardly along the inclined surface 314, so that the developing roller 65K is spaced from the photosensitive drum 63K. Thereby, the separation state where all the developing rollers 65 are spaced from the photosensitive drums 63 is made.

When the first motor 110 is rotated in the forward direction and the switching cam driving gear 335 is thus rotated in the counterclockwise direction from the separation state of FIG. 2C, the switching cam 310 is moved rearwards. As a result, the rotary shaft of the developing roller 65K of the rotary shafts of the four developing rollers 65 supported on the upper surface of the switching cam 310 is first engaged with the recess portion 312 and is moved downwardly, so that the developing roller 65K is contacted to the photosensitive drum 63K, as shown in FIG. 2B. When the switching cam 310 is stopped at this stage, the second contact state is made. When the switching cam driving gear 335 is rotated in the counterclockwise direction from the state of FIG. 2B, the switching cam 310 is moved more rearwards. As a result, as shown in FIG. 2A, the rotary shafts of the developing roller 65Y, 65M, 65C are engaged with the recess portions 313 and are moved downwards, so that the developing roller 65Y, 65M, 65C are contacted to the corresponding photosensitive drum 63Y, 63M, 63C. Thereby, the first contact state is made.

Subsequently, a configuration for controlling the driving mechanism and the like of the color printer 1 is described.

As shown in FIG. 1, the color printer 1 has a controller 10, a first sheet sensor 11 and a second sheet sensor 12.

The first sheet sensor 11 and the second sheet sensor 12 are sensors for detecting the sheet S being conveyed in the housing 2. The first sheet sensor 11 and the second sheet sensor 12 are configured by, for example, an actuator configured to swing as the sheet S abuts thereon and an optical sensor configured to detect the swinging of the actuator, respectively. The first sheet sensor 11 is provided between the registration rollers 37 and the conveyance belt 73 on the conveyance path of the sheet S. The second sheet sensor 12 is provided between the fixing unit 8 and the convey-out rollers 83 on the conveyance path of the sheet S. In below descriptions, a state where the first sheet sensor 11 and the second sheet sensor 12 detect the sheet S is referred to as 'ON' and a state where the first sheet sensor 11 and the second sheet sensor 12 do not detect the sheet S is referred to as 'OFF.'

The controller 10 is a device configured to control the first motor 110, the second motor 210, the developing clutch 139 and the like to thus control the driving of the developing rollers 65, the photosensitive drums 63, the conveyance rollers 92, the discharge rollers 93 and the like, and is provided at an appropriate position in the housing 2. The controller 10 has a CPU (Central Processing Unit), a RAM (Random Access Memory), a ROM (Read Only Memory), an I/O interface and the like (which are not shown), and is configured to execute the control by performing respective calculation processing based on detection results of the sheet sensors 11, 12 and the like, a preset program and the like.

The controller 10 is configured to apply a bias voltage to the chargers 64 and the developing rollers 65. Specifically, the charger 64 and the developing roller 65 are connected to a common power source through a common switch, and are configured to be ON and OFF (bias voltage application/application stop of bias voltage) at the same time as the switch is enabled to be ON and OFF by the controller 10.

When forming images on both faces of the sheet S, the controller 10 stops the rotations of the developing rollers 65, the photosensitive drums 63 and the like and then stops the bias voltage application to the chargers 64 and the like, after the image formation on one surface of the sheet S is over until the image formation on the other surface of the sheet S starts. That is, after the sheet is discharged from the image forming unit 4 (the most downstream photosensitive drum 63K) until the sheet S is re-conveyed to the image forming unit 4 (the most upstream photosensitive drum 63Y) by the re-conveyance rollers 95 and the like, the controller 10 is configured to set the driving sources of the developing rollers 65 and the photosensitive drums 63 to OFF and to set the chargers 64 to OFF after predetermined time from the OFF of the driving sources.

Here, the description 'the driving sources of the developing rollers 65 and the like are set to OFF' means stopping the supply of the driving force to the developing rollers 65 and the like. In this illustrative embodiment, the second motor 210 is stopped and the developing clutch 139 is switched to the cutoff state. Also, in this illustrative embodiment, the 'predetermined time' is set to a constant time equal to or longer than time consumed after the driving sources of the developing rollers 65 and the like are set to OFF until the photosensitive drums 63 are actually stopped. Thereby, the controller 10 is configured to set the chargers 64 to OFF after the rotations of the photosensitive drums 63 are stopped. In the meantime, the 'predetermined time' may be appropriately set by a test, a simulation and the like.

Also, after the chargers 64 are set to OFF until the sheet S is re-conveyed to the image forming unit 4 by the re-conveyance rollers 95 and the like, the controller 10 is configured to set the chargers 64 to ON and to set the driving sources to ON after the chargers 64 are set to ON. Here, the description 'the driving sources of the developing rollers 65 and the like are set to ON' means starting the supply of the driving force to the developing rollers 65 and the like. In this illustrative embodiment, the second motor 210 is enabled to drive and the developing clutch 139 is switched to the connection state.

In this disclosure, it is described that the controller 10 sets the components, such as chargers 63 and driving sources of the developing rollers 65 to ON or OFF, however, this setting by the controller 10 may also be referred that the controller 10 turns on or off the components, such as chargers 63 and driving sources of the developing rollers 65.

Subsequently, processing that is executed by the controller 10 is described with reference to FIGS. 4 to 7. Here, 'surface printing' indicated at the uppermost part of FIG. 7 means the image formation on one surface of the sheet S, and 'backside printing' means the image formation on the other surface of the sheet S. In the meantime, 'surface printing,' 're-conveyance' and 'backside printing' of FIG. 7 are just to indicate operations that are performed at corresponding points of time so as to easily understand the present disclosure and do not indicate exact starting or ending timings of the corresponding operations. Also, at a state (standby state) where the color printer 1 waits for reception of a printing job, the color printer 1 is at the separation state.

Figure 4:
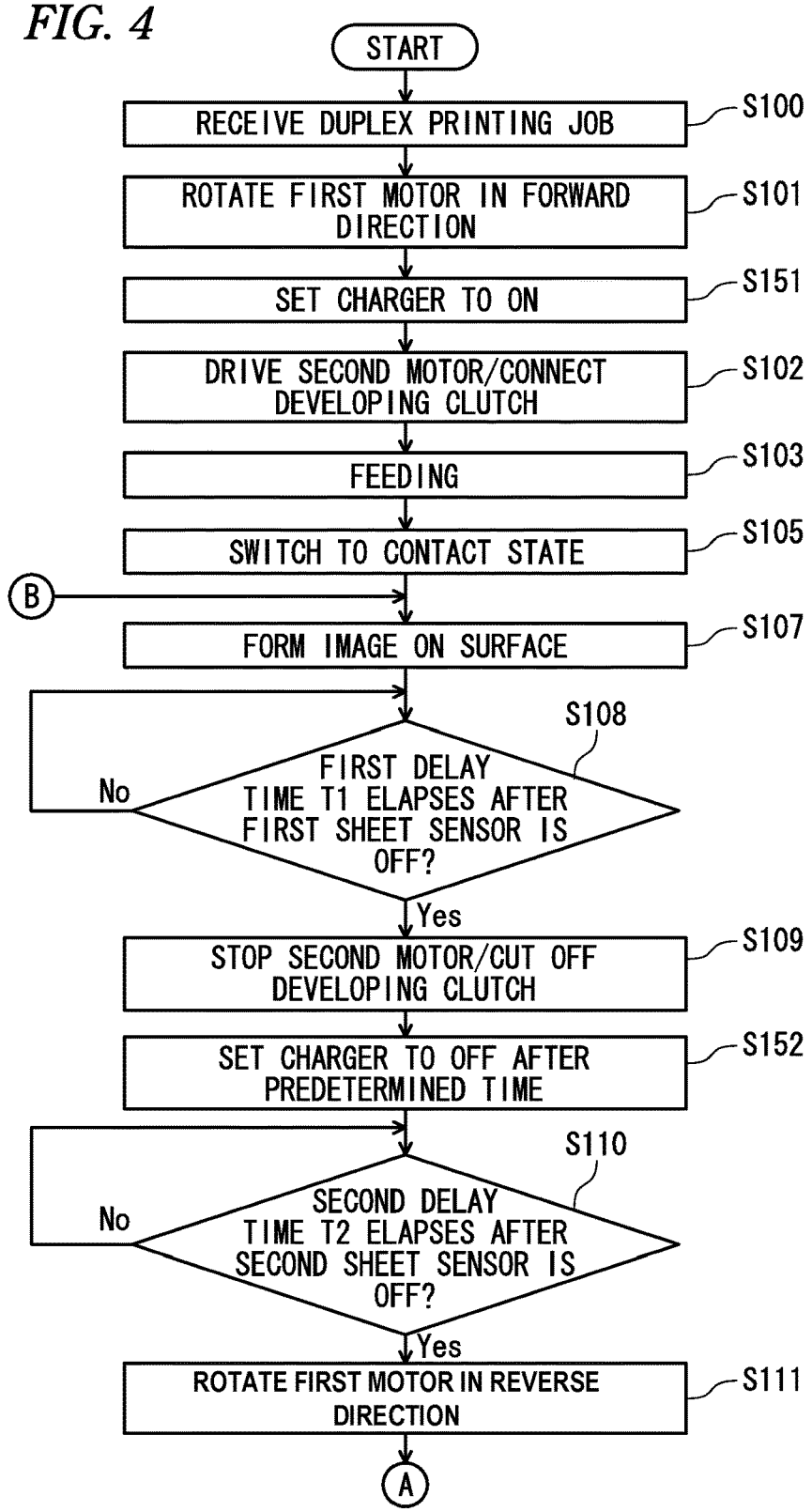
FIG. 4 is a flowchart showing processing that is executed by a controller.

As shown in FIG. 4 (also refer to the timing chart of FIG. 7), when an instruction to form images on both faces of the sheet S or a duplex printing job including image data to be formed is received (S100, time t0), the controller 10 first rotates the first motor 110 in the forward direction and sets the chargers 65 to ON (S101, S151, time t1). Then, the controller 10 drives the second motor 210 at timing delayed than the timing at which the chargers 64 are set to ON, and sets the developing clutch 139 to the connection state to drive the photosensitive drums 63 and developing rollers 65 (S102, time t2).

Subsequently, the controller 10 sets the feeder clutch 166 to the connection state to drive the feeder roller 33, thereby feeding the sheet S in the sheet feeding tray 31 (S103, time t3). In the meantime, after the sheet S is fed, the controller 10 switches the feeder clutch 166 to the cutoff state to stop the driving of the feeder roller 33 (time t4).

Then, the controller 10 sets the clutch 339 to the connection state to drive the switching cam 310, thereby switching the photosensitive drums 63 and the developing rollers 65 from the separation state to the contact state (for the color mode, the first contact state, and for the monochrome mode, the second contact state) (S105, time t5). In the meantime, after the contact state is made, the controller 10 switches the clutch 339 to the cutoff state to stop the driving of the switching cam 310 (time t6). After that, the controller 10 forms an image on the surface of the fed sheet S (S107, surface printing).

Then, when a first delay time T1 elapses after the first sheet sensor 11 becomes OFF (S108, Yes), which is timing at which the rear end of the sheet S exits between the process units 6 and the transfer unit 7, the controller 10 stops the driving of the second motor 210 and switches the developing clutch 139 to the cutoff state to stop the driving of the photosensitive drums 63 and developing rollers 65 (S109, time t9).

Then, the controller 10 sets the chargers 64 to OFF after predetermined time from the execution of step S109 (S152, time t91). That is, in step S152, the controller 10 waits for the stop of the photosensitive drums 63, which continue to rotate by inertia from the stop of the driving source, and then sets the chargers 64 to OFF.

Subsequently, when a second delay time T2 elapses after the second sheet sensor 12 becomes OFF (S110, Yes), which is timing before the rear end of the sheet S exits upwards between the conveyance rollers 92, the controller 10 once stops the first motor 110 (time t10) and then rotates the first motor 110 in the reverse direction (S111, time t11). Thereby, the conveyance rollers 92 and the discharge rollers 93 are rotated in the reverse direction, so that the sheet S is guided to the re-conveyance path 94 and is thus re-conveyed towards the image forming unit 4.

Figure 5:
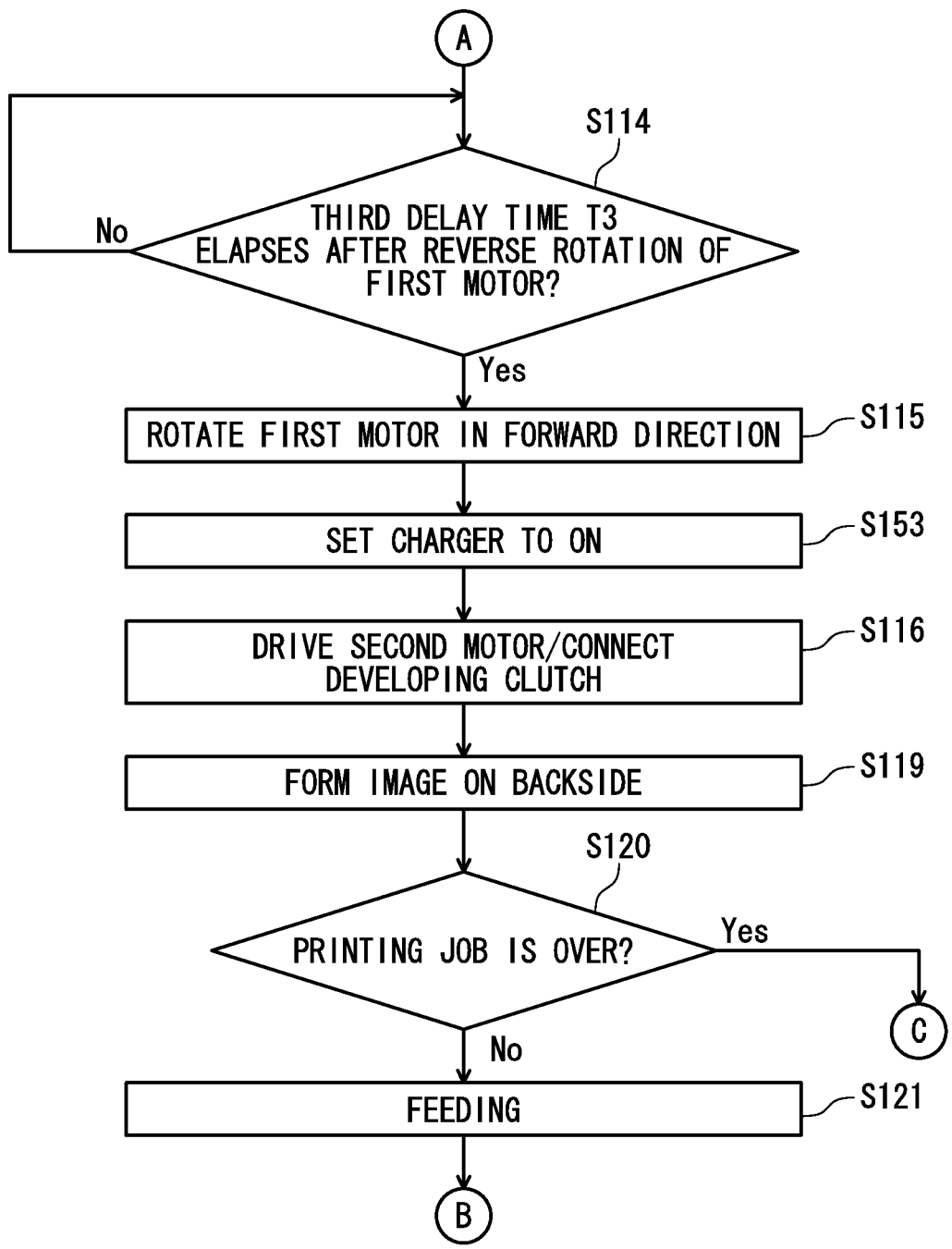
FIG. 5 is a flowchart showing processing that is executed by the controller.

Subsequently, as shown in FIG. 5, when a third delay time T3 elapses after the reverse rotation of the first motor 110 starts (S114, Yes), the controller 10 once stops the first motor 110 (time t14) and then again rotates the first motor 110 in the forward direction and again sets the chargers 64 to ON (S115, S153, time t15). Then, the controller 10 drives the second motor 210 at timing delayed than the timing at which the chargers 64 are again set to ON, and switches the developing clutch 139 to the connection state to resume the driving of the photosensitive drums 63 and developing rollers 65 (S116, time t16).

Thereafter, the controller 10 forms an image on the backside of the sheet S again fed to the image forming unit 4 (S119, backside printing). When the printing job is not over (S120, No), the controller 10 switches the feeder clutch 166 to the connection state to drive the feeder roller 33, thereby feeding a next sheet S (S121, time t21). After that, the controller 10 returns to step S107 of FIG. 4 and executes the processing thereof and thereafter (refer to time t21 to t34).

Figure 6:
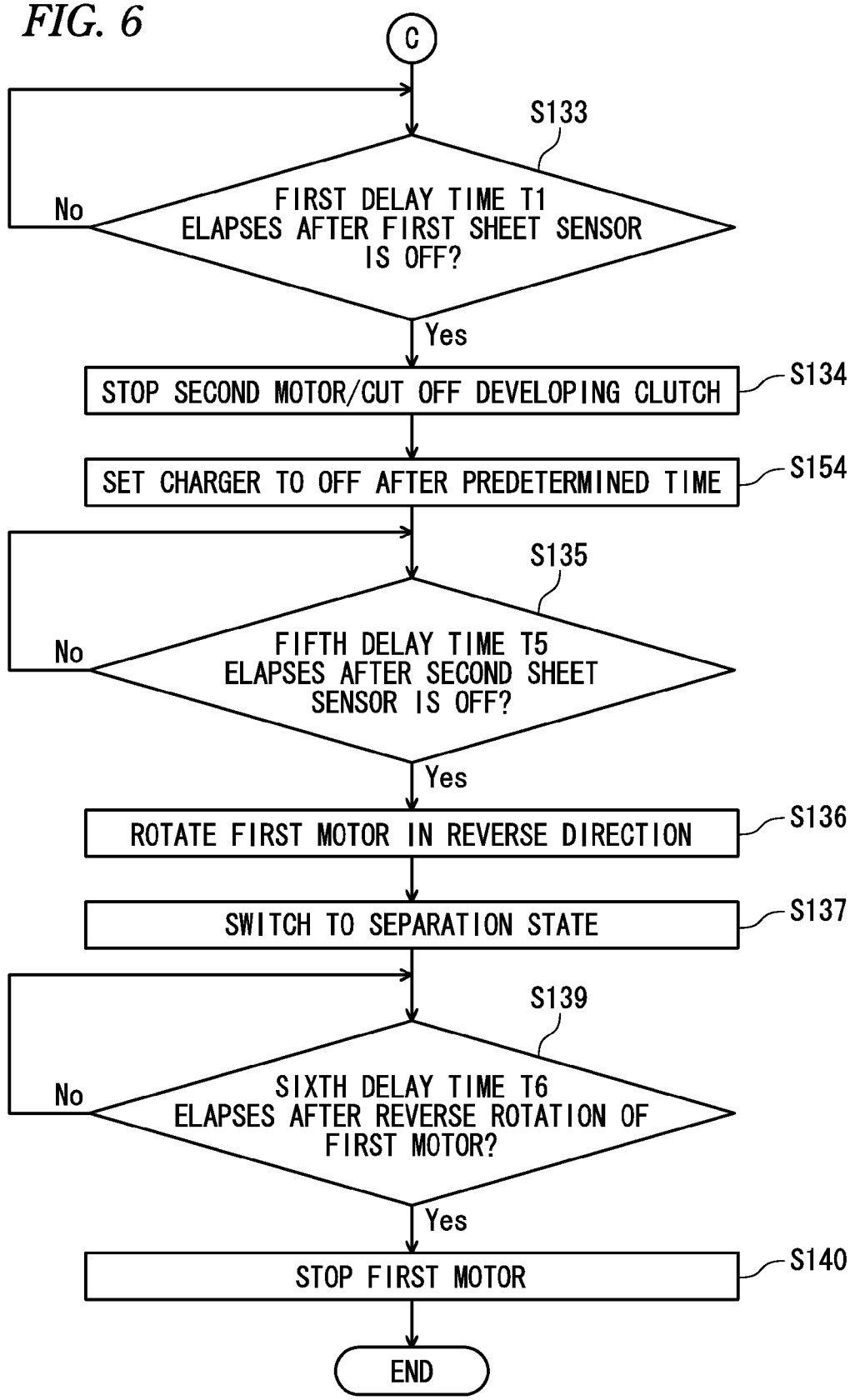
FIG. 6 is a flowchart showing processing that is executed by the controller.

In step S210 of FIG. 5, when the printing job is over (Yes), the controller 10 stops the driving of the second motor 210 and switches the developing clutch 139 to the cutoff state to stop the driving of the photosensitive drums 63 and the developing rollers 65 (S134, time t34) at the time that the first delay time T1 elapses after the first sheet sensor 11 becomes OFF (S133, Yes), as shown in FIG. 6.

Then, the controller 10 sets the chargers 64 to OFF after predetermined time from the execution of step S134 (S154, time t92). That is, also in step S154, the controller 10 waits for the stop of the photosensitive drums 63, which continue to rotate by inertia from the stop of the driving source, and then sets the chargers 64 to OFF.

Then, when a fifth delay time T5 elapses after the second sheet sensor 12 becomes OFF (S135, Yes), which is timing at which the rear end of the sheet S exits between the discharge rollers 93 and is discharged onto the sheet discharge tray 22 from the discharge opening 23, the controller 10 once stops the first motor 110 (time t35) and then rotates the first motor 110 in the reverse direction (S136, time t36).

Subsequently, while the first motor 110 is rotated in the reverse direction, the controller 10 switches the clutch 339 to the connection state for predetermined time to drive the switching cam 310 by a predetermined amount, thereby switching the photosensitive drums 63 and the developing rollers 65 from the contact state to the separation state (S137, time t37). Then, when a sixth delay time T6 elapses after the reverse rotation of the first motor 110 starts (S139, Yes), which is a time period enough to drive the switching cam 310 and to thus switch the switching cam 310 from the contact state to the separation state, the controller 10 stops the first motor 110 (S140, time t40) and ends the processing.

According to the above illustrative embodiment, following operational advantages are satisfied.

After the sheet S is discharged from the image forming unit 4 until the sheet is re-conveyed to the image forming unit 4 (hereinafter, referred to as 'during the re-conveyance'), the driving sources are set to OFF, so that it is possible to suppress the unnecessary driving of the photosensitive drums 63 and developing rollers 65. Therefore, it is possible to prolong the lifetimes of the photosensitive drums 63 and developing rollers 65.

Figure 8A:
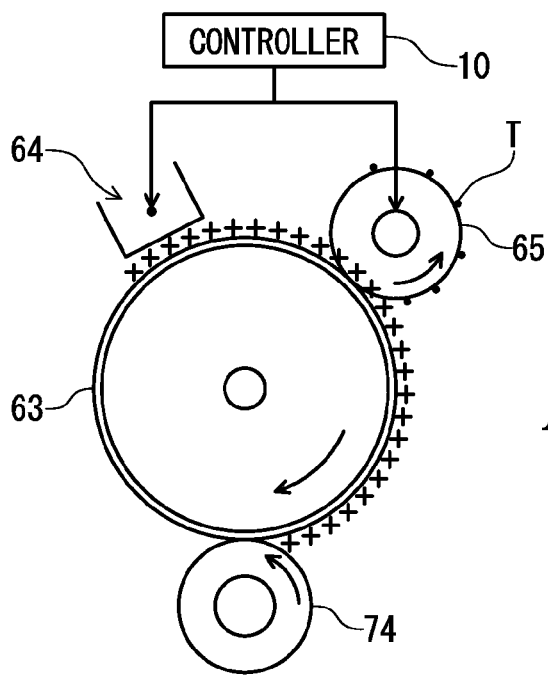
Figure 8B:
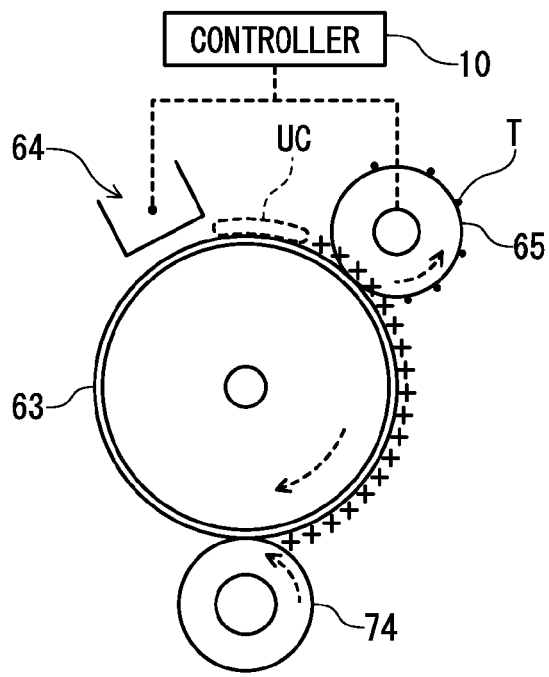
Figure 8C:
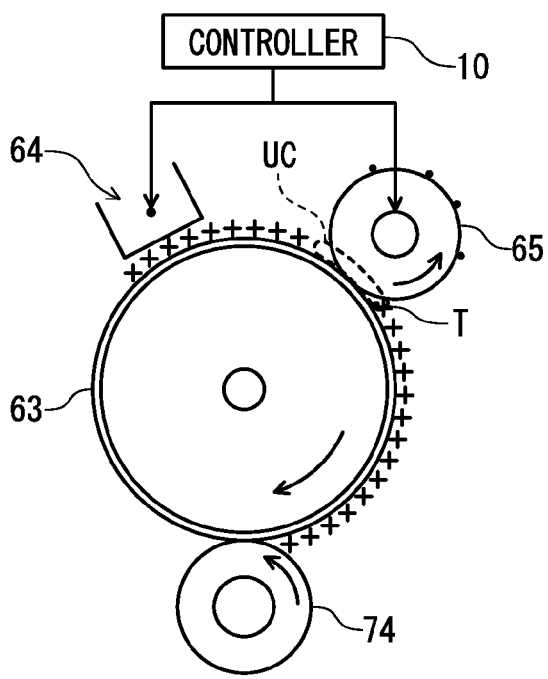

Also, during the re-conveyance, the chargers 64 are set to OFF after the driving sources are set to OFF. Therefore, a non-charged part of the surface of the photosensitive drum 63 (a part of the surface of the photosensitive drum 63, which is positioned at a more upstream side than the charger 64 with respect to the rotating direction), which is not charged by the charger 64, is prevented from moving towards between the charger 64 and the developing roller 65 due to the inertia rotation of the photosensitive drum 63. Specifically, as shown in FIGS. 8A to 8C, in a configuration where the charger 64 is set to OFF before the driving source is set to OFF, for example, the photosensitive drum 63 continues to rotate at the time that the charger 64 is set to OFF, and the photosensitive drum 63 rotates by the inertia thereof even after the driving source is set to OFF. Thereby, as shown in FIG. 8B, a non-charged part UC of the surface of the photosensitive drum 63, which is not charged by the charger 64, is moved downstream of the charger 64. In the meantime, the dotted arrow in FIGS. 8 and 9 indicates the inertia rotation.

Thereby, when the photosensitive drum 63 is stopped, the non-charged part UC is generated between the charger 64 and the developing roller 65. For this reason, as shown in FIG. 8C, when the driving source is again set to ON so as to print the backside of the sheet S, the non-charged part UC is moved towards the developing roller 65 and the toner T on the developing roller 65 having the bias voltage applied thereto is erroneously attached to the non-charged part UC. As a result, the sheet S is tainted by the toner T attached to the non-charged part UC.

Figure 9A:
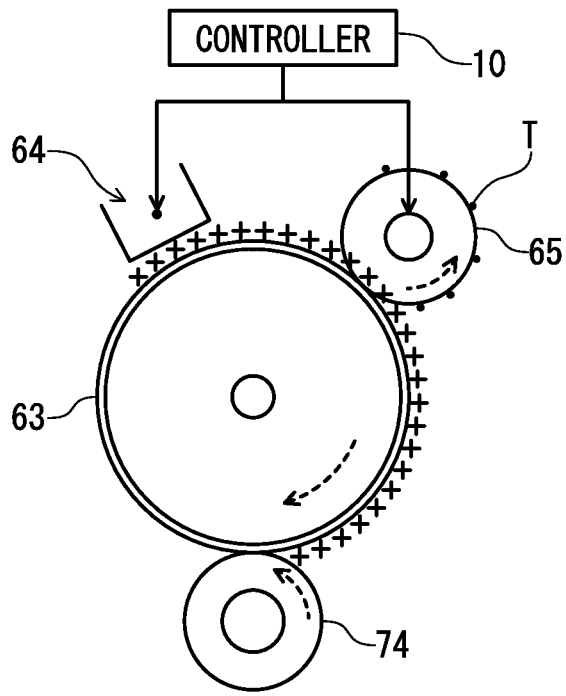
FIGS. 9A and 9B illustrate states of the surface potential of the photosensitive drum when the charger, the second motor and the like are set to OFF in order of this illustrative embodiment.
Figure 9B:
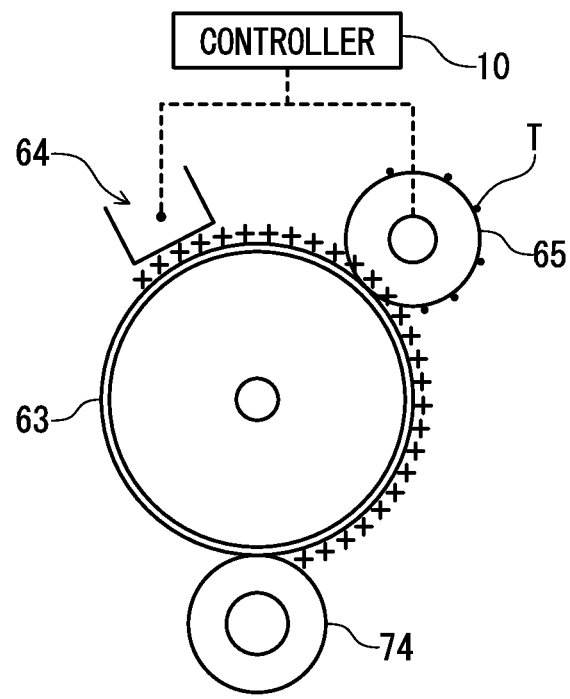

In contrast, according to this illustrative embodiment, as shown in FIGS. 9A and 9B, the charger 64 is set to OFF after the photosensitive drum 63 is stopped. Thereby, the charging by the charger 64 can be performed even when the photosensitive drum 63 is rotating by the inertia. Therefore, it is possible to suppress the non-charged part from being generated between the charger 64 and the developing roller 65. For this reason, during the backside printing of the sheet S, it is possible to suppress a situation where the toner T on the developing roller 65 is erroneously attached to the non-charged part and the sheet S is thus tainted by the toner T attached to the non-charged part.

In the meantime, for example, in a structure where the charger and the developing roller can be respectively set to ON at different timings (timings at which the bias voltage is applied) by separate power supplies and switches, even when a part of the photosensitive drum between the charger and the developing roller is made as a non-charged part, the toner is prevented from being moved from the developing roller to the non-charged part if the developing roller is set to OFF until the non-charged part passes through the developing roller, during the backside printing. In contrast, according to the structure of this illustrative embodiment, i.e., the structure where when the charger 64 is set to ON, the developing roller 65 is also set to ON at the same time, when a non-charged part is generated on the surface of the photosensitive drum 63, the toner on the developing roller 65 is likely to move to the non-charged part. Therefore, when the present disclosure is applied to the structure where the above-described problem is likely to occur, it is possible to satisfy the favorable advantages.

In the above illustrative embodiment, the developing clutch 139 is switched to the cutoff state to stop the driving of the developing cartridge 62K and the driving of the second motor 210 is stopped to stop the driving of the developing cartridges 62Y, 62M, 62C. Therefore, it is possible to suppress an increase in the cost of the color printer 1 and also to suppress the driving mechanism for transmitting the driving force to the developing cartridges 62 from being complicated and enlarged.

To describe further, if the driving force is applied from the first motor to all the developing cartridges and the electromagnetic clutch is switched to the cutoff state to stop the driving of all the developing cartridges, the torque for driving the developing cartridges is increased. Therefore, a size of the electromagnetic clutch is increased or the number of electromagnetic clutches is increased, so that the cost may be increased. Also, if the driving force is applied from the second motor to all the developing cartridges and the driving of the second motor is stopped to stop the driving of all the developing cartridges, a size of the second motor is increased or a cooling fan should be necessarily provided as a countermeasure against the temperature increase of the second motor, which also increases the cost. In contrast, according to the above illustrative embodiment, since the above described problems are not caused, it is possible to prevent increase of cost of the color printer 1.

If the driving force is applied from one motor to all the developing cartridges, a configuration for switching the color mode in which all the developing cartridges are driven, the monochrome mode in which the driving of some developing cartridges is stopped and a mode in which the driving of all the developing cartridges is stopped may be complicated or enlarged. For example, if a swingable gear configured to switch the transmission and cutoff of the driving force is provided between the motor and the developing cartridge and the gear is enabled to swing by a cam configured to linearly move, it is necessary to provide the swingable gears between the motor and the black developing cartridge and between the motor and the developing cartridges except for the black developing cartridge, which complicates the configuration. Also, when the two swingable gears are enabled to move by one cam, the cam is enlarged. In contrast, according to the above illustrative embodiment, since the corresponding problems are not caused, it is possible to prevent the driving mechanism from being complicated and enlarged.

In the above illustrative embodiment, the timing (time t1) at which the driving of the first motor 110 starts, the timing (time t14 to t15) at which the first motor 110 is switched from the reverse rotation to the forward rotation, and the timing (time t2, t16) at which the driving of the second motor 210 starts are made to be different each other. Therefore, it is possible to make timing, at which current is supplied to the first motor 110, and timing, at which current is supplied to the second motor 210, different. Since the high current is required to start the motor, if the timing at which the current is supplied to the first motor and the timing at which the current is supplied to the second motor are synchronized, it may be difficult to stably drive the motors upon the activations thereof. However, according to the above illustrative embodiment, it is possible to stably and smoothly start activating the first motor 110 and the second motor 210.

Although the illustrative embodiment has been described, the present disclosure is not limited to the configuration of the above illustrative embodiment. The specific configurations can be appropriately changed without departing from the scope of the present disclosure, as follows. Meanwhile, in below descriptions, the substantially same configurations as the above illustrative embodiment are denoted with the same reference numerals and the descriptions thereof are omitted.

Figure 10:
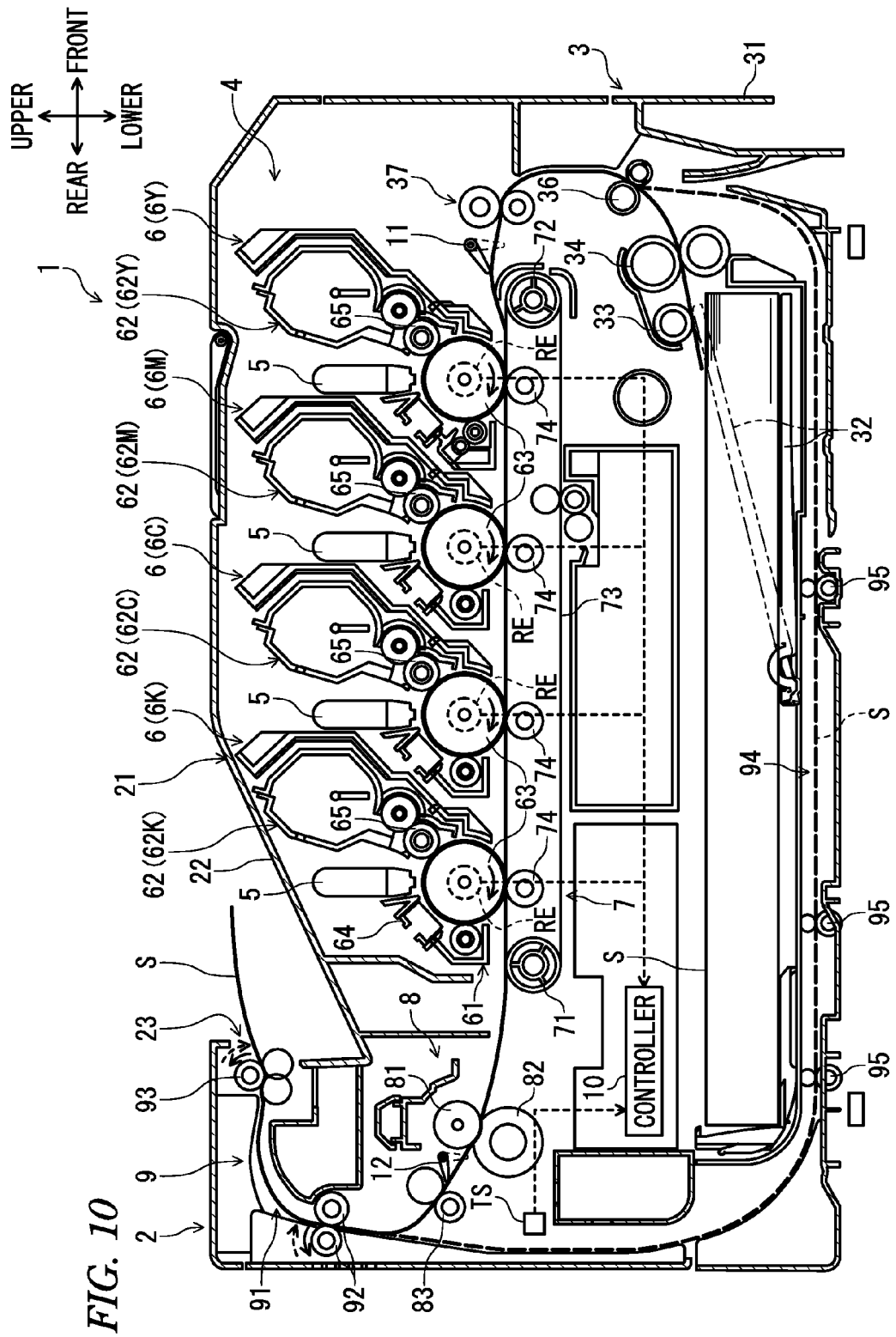
FIG. 10 illustrates a modified embodiment of the image forming apparatus.

In the above illustrative embodiment, regarding the predetermined time after the driving source is set to OFF until the charger 64 is set to OFF, the constant time is set. However, the present disclosure is not limited to such configuration, and the predetermined time may be appropriately changed depending on environment conditions and the like. For example, as shown in FIG. 10, when a temperature detector TS for detecting a temperature of an inside or outside of the housing 2 is provided for the color printer 1, the predetermined time may be set depending on a temperature detected by the temperature detector TS.

Specifically, when the detected temperature is equal to or lower than a first temperature, the controller 10 sets the predetermined time to a first delay time, and when the detected temperature is higher than the first temperature, the controller 10 sets the predetermined time to a second delay time longer than the first delay time. In the meantime, the predetermined time may be set based on a map, a function and the like showing a relation between the temperature and the predetermined time.

Figure 11:
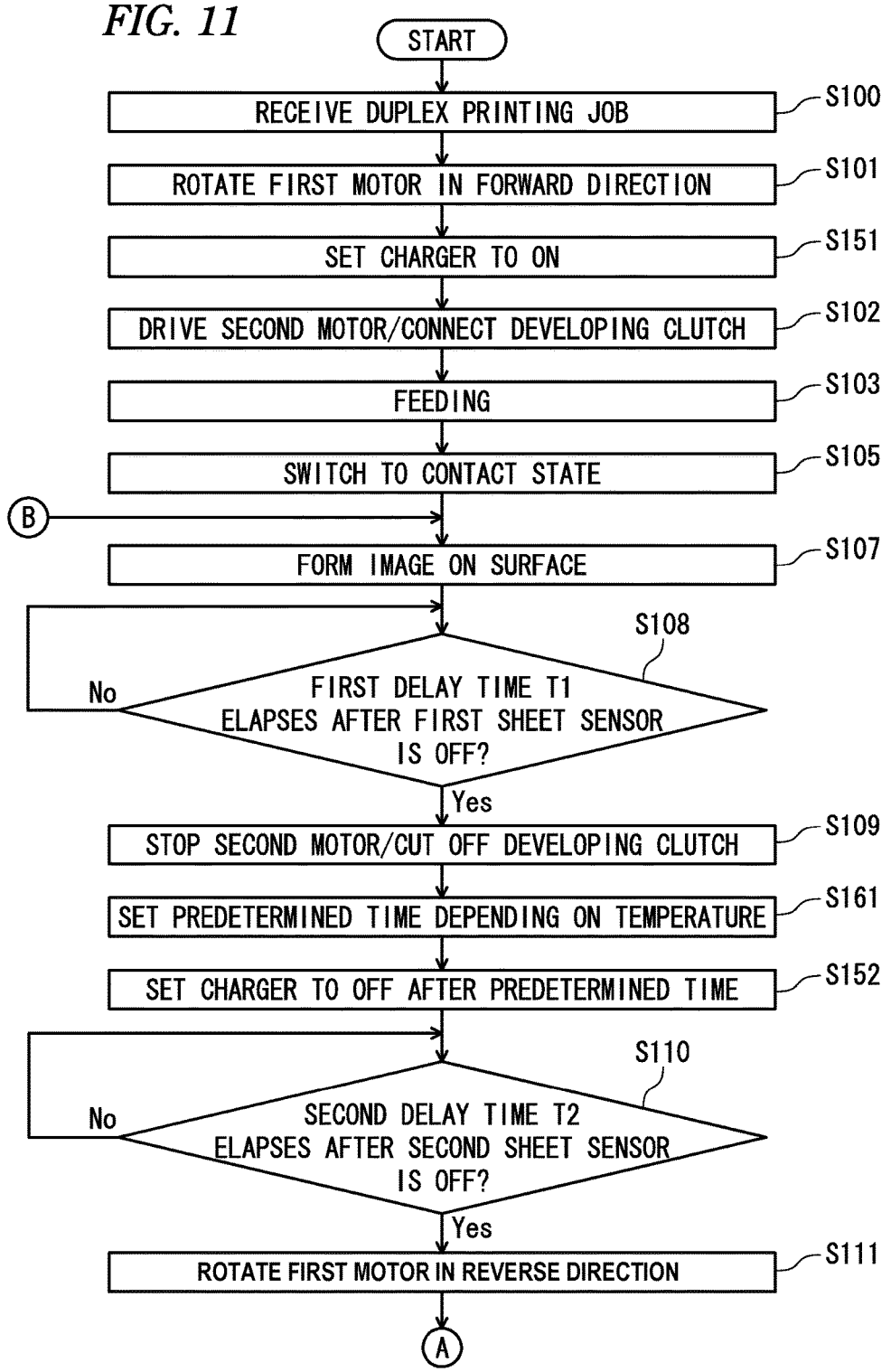
FIG. 11 is a flowchart showing processing that is executed by the controller in accordance with a first modified embodiment.

More specifically, as shown in FIG. 11, new processing (S161) of setting the predetermined time depending on the detected temperature may be provided between steps S109 and S152 in the flowchart of FIG. 4.

Here, when the temperature of the inside or outside of the housing 2 is high, the viscosity of the grease provided for a bearing of the photosensitive drum 63 is lowered, as compared to a case where the temperature is low, so that the amount of the inertia rotation of the photosensitive drum 63 tends to increase. In contrast, according to the above configuration, when the temperature is high, the timing at which the charger 64 is set to OFF is delayed (the time from the OFF of the driving source to the OFF of the charger 64 is set to be long). Therefore, even when the temperature is high and the rotation of the photosensitive drum 63 is hardly stopped, the charger 64 can be set to OFF in conformity to the stop of the photosensitive drum 63. Also, when the temperature is low, the photosensitive drum 63 is earlier stopped, as compared to a case where the temperature is high. However, since the timing at which the charger 64 is set to OFF is accelerated, it is possible to shorten the time consumed after the photosensitive drum 63 is stopped until the charger 64 is set to OFF, so that it is possible to reduce the power consumption of the charger 64.

In the above illustrative embodiment, the charger 64 is again set to ON just after the first motor 110 is switched from the reverse rotation to the forward rotation. However, the present disclosure is not limited to such configuration. For example, the charger 64 may be set to ON after a predetermined prescribed time elapses from the point of time at which the first motor 110 is returned to the forward rotation. In this case, the time for which the charger 64 is set to OFF is prolonged, as compared to the above illustrative embodiment, so that it is possible to suppress the power consumption of the charger 64.

Also, in this case, the prescribed time is preferably set to a time after the charger 64 is set to OFF until the surface potential of the charged part of the photosensitive drum 63 is lowered to a predetermined value. That is, the controller 10 is preferably configured to set the charger 64 to ON before the surface potential of the charged part of the photosensitive drum 63 is lowered to a predetermined value after the charger 64 is set to OFF.

Figure 12:
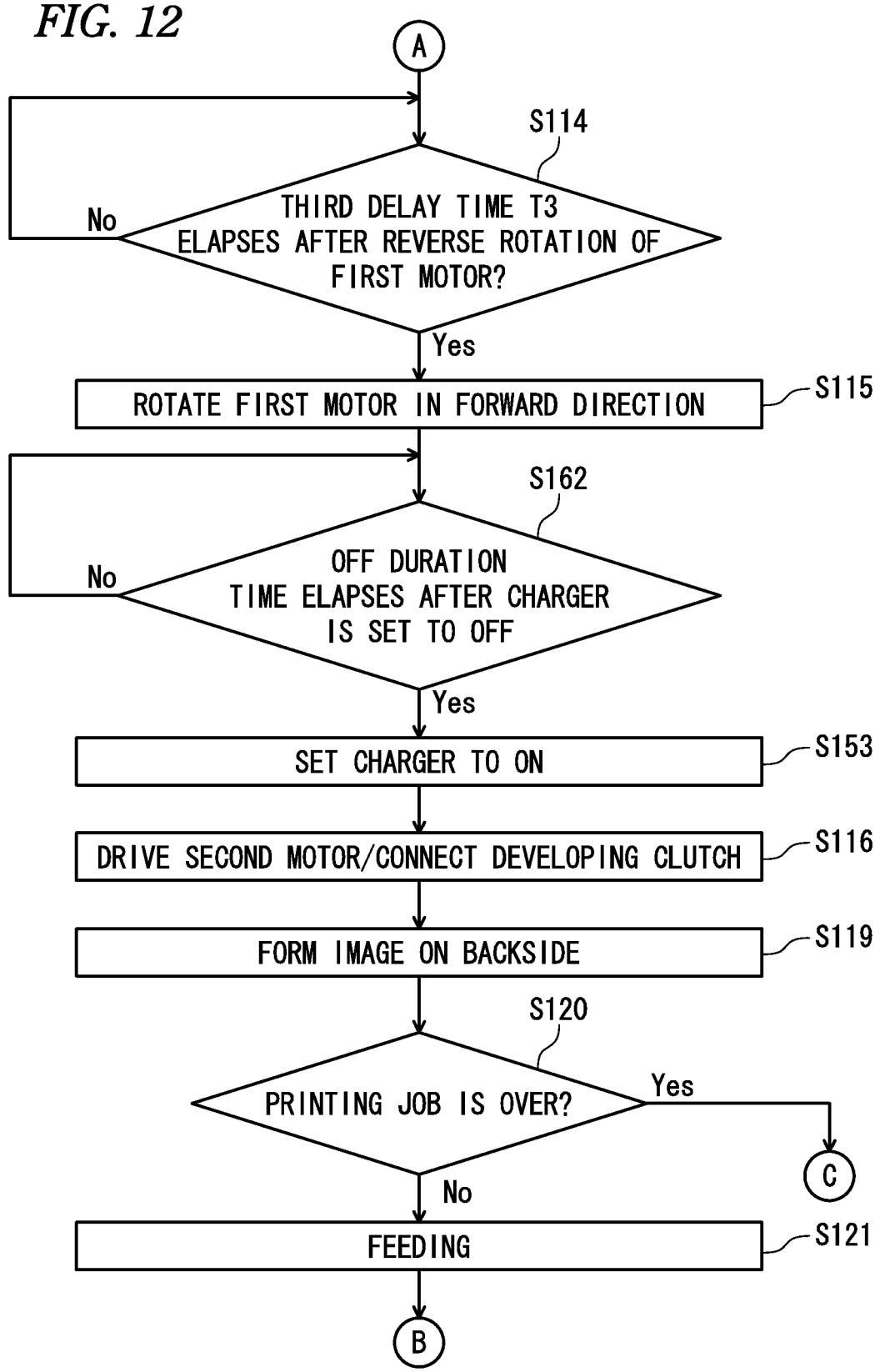
FIG. 12 is a flowchart showing processing that is executed by the controller in accordance with a second modified embodiment.

Specifically, as shown in FIG. 12, new processing (S162) of determining whether the predetermined prescribed time (hereinafter, referred to as 'OFF duration time') elapses after the charger 64 is set to OFF may be provided between steps S115 and S153 in the flowchart of FIG. 5. When the OFF duration time elapses (S162, Yes), the controller may proceed to the processing of step S153. Here, the 'OFF duration time' is a time period equal to or shorter than a time period after the charger 64 is set to OFF until the surface potential of the charged part of the photosensitive drum 63 is lowered to a predetermined value by dark decay, and may be appropriately set by a test, a simulation and the like.

According to the above configuration, the surface potential of the charged part of the photosensitive drum 63 is lowered to a predetermined value, so that it is possible to prevent the toner on the developing roller 65 from being erroneously attached to the part of which the surface potential has been lowered.

The OFF duration time may be appropriately changed depending on the environment conditions and the like. For example, as shown in FIG. 10, when the temperature detector TS for detecting a temperature of an inside or outside of the housing 2 is provided for the color printer 1, the controller 10 may be configured to set the OFF duration time depending on a temperature detected by the temperature detector TS.

Specifically, when the detected temperature is equal to or lower than a second temperature, the controller 10 sets the OFF duration time to a third delay time, and when the detected temperature is higher than the second temperature, the controller 10 sets the OFF duration time to a fourth delay time shorter than the third delay time. In the meantime, the OFF duration time may be set based on a map, a function and the like showing a relation between the temperature and the OFF duration time.

Figure 13:
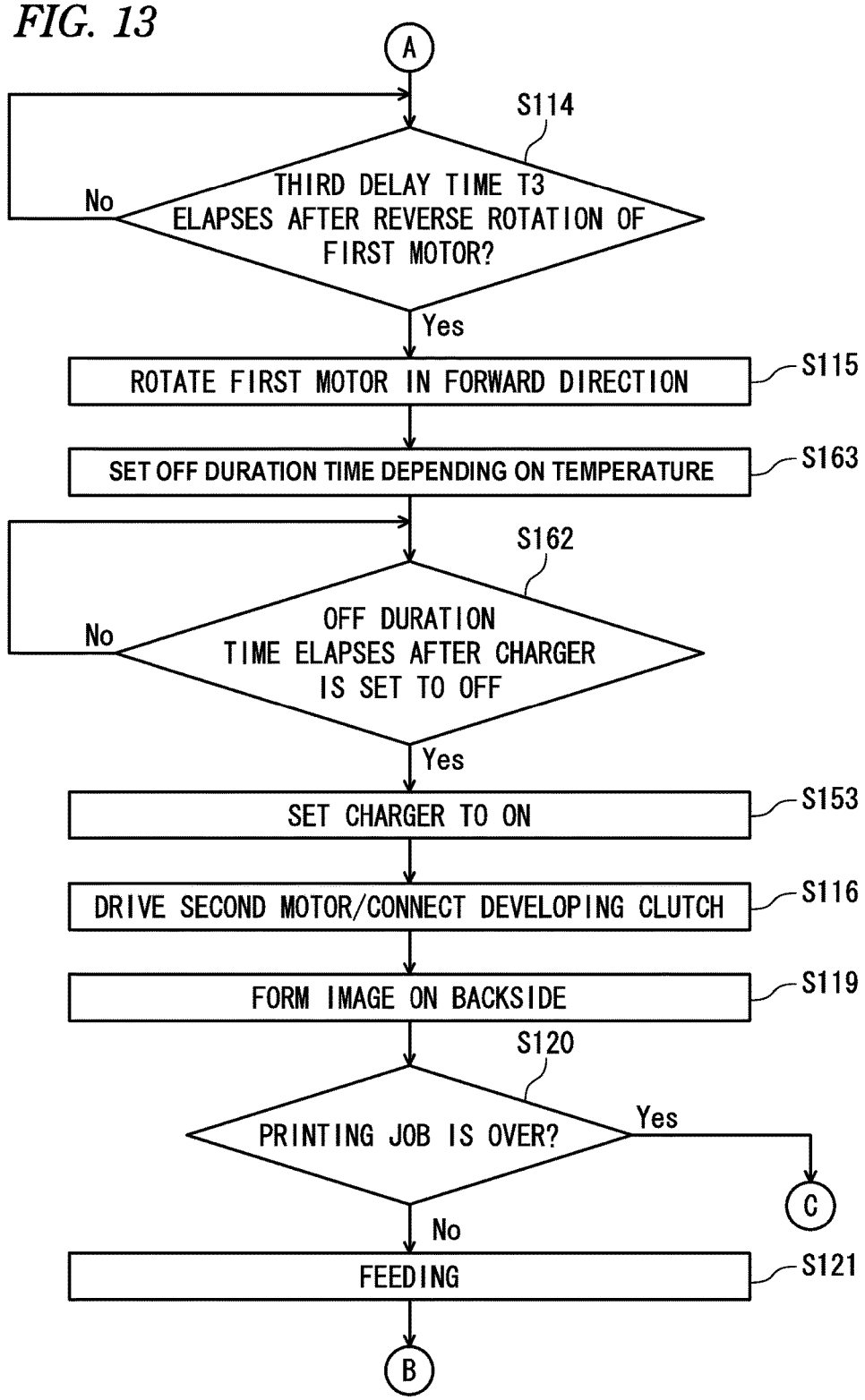
FIG. 13 is a flowchart showing processing that is executed by the controller in accordance with a third modified embodiment.

More specifically, as shown in FIG. 13, new processing (S163) of setting the OFF duration time depending on the detected temperature may be provided between steps S115 and S162 in the flowchart of FIG. 12.

When the temperature of the inside or outside of the housing 2 is high, the surface potential of the photosensitive drum 63 is more likely to be dark decayed (the surface potential tends to be lowered more rapidly), as compared to a case where the temperature is low. In contrast, according to the above configuration, when the temperature is high, the timing at which the charger 64 is set to ON is accelerated (the OFF duration time is shortened). Therefore, it is possible to favorably prevent the toner from being erroneously attached to the part of the photosensitive drum 63 of which the surface potential has been lowered due to the dark decay. Also, when the temperature is low, since the timing at which the charger 64 is set to ON is delayed, it is possible to reduce the power consumption of the charger 64.

The OFF duration time may be adjusted depending on the humidity or a using amount of the photosensitive drum, for example. For instance, as a total amount of rotation of the photosensitive drum (a total amount of rotation after a brand-new drum cartridge is mounted unit it is replaced) increases, the surface potential of the photosensitive drum is more likely to be dark decayed. Therefore, when the OFF duration time is set to be shorter in a case where the total amount of rotation is equal to or greater than a predetermined value, as compared to a case where the total amount of rotation is less than the predetermined value, it is possible to suppress the problem caused due to the dark decay.

Figure 14:
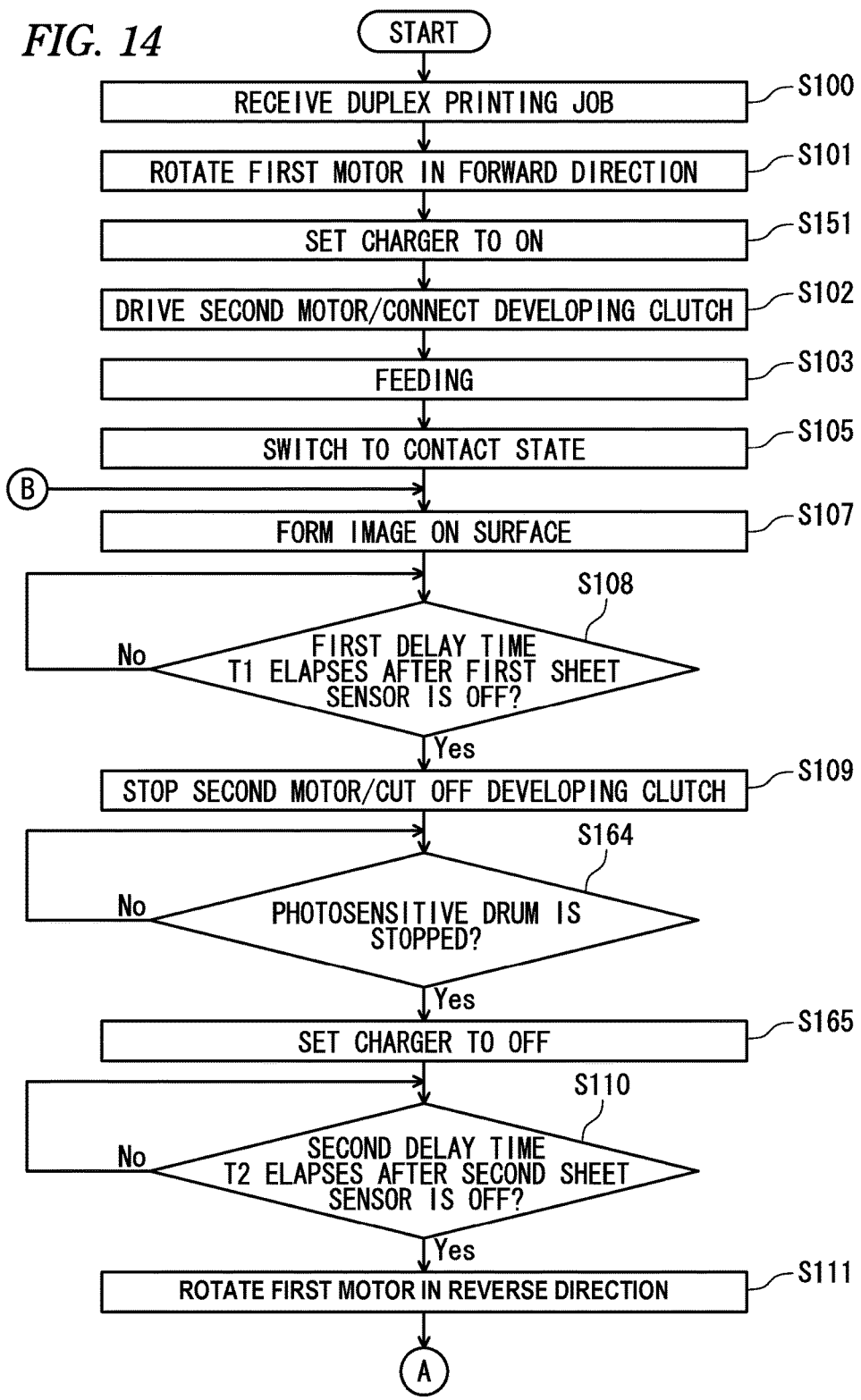
FIG. 14 is a flowchart showing processing that is executed by the controller in accordance with a fourth modified embodiment.

Also, as shown in FIG. 10, the color printer 1 may be provided with a rotary encoder RE, which is an example of the stop detector for detecting the stop of the photosensitive drum 63. In this case, the controller 10 may set the charger 64 to OFF when the stop of the photosensitive drum 63 is detected by the rotary encoder RE. More specifically, as shown in FIG. 14, processing (S164) of determining whether the photosensitive drum 63 is stopped based on a signal from the rotary encoder RE and processing (S165) of setting the charger 64 to OFF when it is determined in step S164 that the photosensitive drum 63 is stopped may be newly provided, instead of the processing of step S152 in the flowchart of FIG. 4.

According to the above configuration, since the stop of the photosensitive drum 63 is detected by the rotary encoder RE, it is possible to more favorably suppress the generation of the non-charged part on the surface of the photosensitive drum 63. In the meantime, the stop detector is not limited to the rotary encoder RE. For example, a sensor for detecting a back electromotive force of the second motor 210 for driving the photosensitive drum 63 may be adopted.

In the above illustrative embodiment, the charger 64 is set to OFF after the photosensitive drum 63 is stopped. However, the present disclosure is not limited to such configuration. For example, when the amount of the inertia rotation of the photosensitive drum 63 is lowered to a very small amount, the charger may be set to OFF after the driving source is set to OFF and before the photosensitive drum is stopped. That is, when the non-charged part formed on the photosensitive drum is very small and the surface potential of the non-charged part is increased due to the influence of the surface potentials of the charged parts positioned upstream and downstream of the non-charged part, the toner is not moved from the developing roller to the non-charged part. Therefore, in this case, the charger may be set to OFF even before the photosensitive drum is stopped. However, when the charger is set to OFF after the photosensitive drum is stopped, like the above illustrative embodiment, it is possible to more favorably suppress the generation of the non-charged part on the surface of the photosensitive drum.

In the above illustrative embodiment, the driving source is set to ON after the charger 64 is set to ON. However, the present disclosure is not limited to such configuration. For example, the driving source may be set to ON simultaneously with the ON of the charger. The charger may be set to ON after a slight time for which the non-charged part is not generated on the surface of the photosensitive drum elapses from the ON of the driving source.

In the above illustrative embodiment, after both faces of one sheet S are printed, a duplex printing of a next sheet S is performed. However, the present disclosure is not limited to such configuration. For example, the image formation may be performed in such a manner that a next sheet is conveyed to the image forming unit between the printing of a first surface of one sheet and the printing of a second surface thereof. Also in this case, the control of the present disclosure (the control of setting the driving source and the charger to ON and OFF) is preferably performed between the printing of a first surface of one sheet and the printing of a second surface thereof and during a time period for which the image formation is not performed in the image forming unit.

In the above illustrative embodiments, the developing clutch 139 is set to the cutoff state to stop the driving of the developing cartridge 62K and the driving of the second motor 210 is stopped to stop the driving of the developing cartridges 62Y, 62M, 62C. However, the present disclosure is not limited to such configuration. For example, the developing clutch may not be provided, the driving force may be transmitted from the second motor to all the developing cartridges and the driving of the second motor may be stopped to stop the driving of all the developing cartridges. The driving force may be transmitted from the first motor to all the developing cartridges and the electromagnetic clutch may be set to the cutoff state to stop the driving of all the developing cartridges.

In the above illustrative embodiment, the switching mechanism 300 is provided. However, the present disclosure is not limited to such configuration. For example, the switching mechanism may not be provided (the photosensitive drum and the developing roller are not separated from each other). In the meantime, in the configuration where the switching mechanism is provided, the developing roller is separated from the photosensitive drum during the re-conveyance, so that it is possible to suppress the wear of the developing roller and the like. However, when increasing the printing speed of the sheet higher than the current situation, it may not be possible to secure the time for which the developing roller is separated and is again contacted to the photosensitive drum during the re-conveyance. In contrast, according to the present disclosure, since the driving source and the charger are simply set to OFF, it is possible to further increase the printing speed of the sheet.

The configuration of the image forming unit 4 described in the above illustrative embodiments is just exemplary and is not limited to the above configuration. For example, in the above illustrative embodiment, the LEDs are blinked, so that the LED unit 5 exposes the surface of the photosensitive drum 63. However, the present disclosure is not limited to such configuration. For example, a laser scanner configured to expose the photosensitive drum with laser light may also be provided. Also, in the above illustrative embodiment, the photosensitive drum 63 has been exemplified as the photosensitive member. However, the present disclosure is not limited to such configuration. For example, a photosensitive belt may also be adopted. The configuration of the developing cartridge 62 described in the above illustrative embodiment is just exemplary. For example, a unit for which the developing roller and the supply roller are provided and a unit for which the toner accommodation part is provided may be detachably configured.

In the above illustrative embodiments, the roller fixing-type fixing unit 8 has been exemplified. However, the present disclosure is not limited to such configuration. For example, a belt fixing-type fixing unit may also be adopted.

In the above illustrative embodiment, the color printer 1 having the plurality of photosensitive drums 63 (the first photosensitive member and the second photosensitive member) and the plurality of developing cartridges 62 (the first developing device and the second developing device) and capable of forming both a color image and a monochrome image has been exemplified as the image forming apparatus. However, the present disclosure is not limited to such configuration. For example, the image forming apparatus may be a printer having one photosensitive drum and one developing cartridge and capable of forming only a monochrome image. The image forming apparatus is not limited to the printer and may be a copier, a complex machine and the like having a document reading device such as a flat bed scanner.

In the above illustrative embodiments, the sheet S such as a normal sheet, a postcard and the like has been exemplified as the recording sheet. However, the present disclosure is not limited to such configuration. For example, an OHP sheet may also be used as the recording sheet.

What is claimed is:

1. An image forming apparatus comprising:
    an image forming unit comprising a photosensitive member configured to rotate, a charger configured to charge a surface of the photosensitive member, and a developer carrier configured to rotate and supply developer to an electrostatic latent image formed on the photosensitive member to form a developer image, the image forming unit being configured to transfer the developer image to a recording sheet to form an image on the recording sheet;

a motor configured to drive the photosensitive member and the developer carrier;
a temperature sensor configured to detect a temperature;
a controller configured to control the motor and the charger; and
a re-conveyance mechanism including a roller configured to reverse the recording sheet discharged from the image forming unit and to convey the recording sheet back towards the image forming unit,
wherein the controller is configured to:
turn off the motor to stop driving the photosensitive member and the developer carrier after completion of a first printing process by the image forming unit;
maintaining the motor in an off state while the re-conveyance mechanism is reconveying the recording sheet to the image forming unit;
turn off the charger after an expiration of a time period and after the recording sheet of the first printing process is discharged from the image forming unit until the recording sheet is re-conveyed to the image forming unit, from when the motor is turned off and while the motor is still in the off state; and
maintaining the charger in an off state while the re-conveyance mechanism is reconveying the recording sheet to the image forming unit and while the motor is in the off state,
wherein the controller sets the time period, starting when the motor is turned off and ending when the charger is turned off, to a first amount of time when the temperature detected by the temperature sensor is equal to or lower than a first temperature, and
wherein the controller sets the time period to a second amount of time that is longer than the first amount of time when the temperature detected by the temperature sensor is higher than the first temperature.

2. The image forming apparatus according to claim 1, wherein the controller is configured to turn off the charger after rotation of the photosensitive member is stopped.

3. The image forming apparatus according to claim 1 further comprising:
a stop sensor configured to detect stoppage of the photosensitive member,
wherein the controller turns off the charger after the stoppage of the photosensitive member is detected by the stop sensor.

4. The image forming apparatus according to claim 1, wherein the controller turns on the charger from the off state before the recording sheet has reached the image forming unit through re-conveyance by the re-conveyance mechanism, and
wherein the controller turns on the motor simultaneously with the charger or after turning on the charger.

5. The image forming apparatus according to claim 4, wherein the controller turns on the charger from the off state before a surface potential of the photosensitive member is lowered to a predetermined value.

6. The image forming apparatus according to claim 5 further comprising:
a temperature sensor configured to detect a temperature,
wherein the controller sets a time period after the charger is turned off until the charger is turned on to a third amount of time when the temperature detected by the temperature sensor is equal to or lower than a second temperature, and
wherein the controller sets the time period after the charger is turned off until the charger is turned on to a fourth amount of time that is shorter than the third amount of time when the temperature is higher than the second temperature.

7. The image forming apparatus according to claim 1, wherein the charger and the developer carrier are configured to be turned on simultaneously by a common power source and a common switch.

8. The image forming apparatus according to claim 1, wherein the image forming unit comprises a plurality of sets of the photosensitive member, the charger and the developer carrier.

9. An image forming apparatus comprising: a first conveyance roller configured to convey a sheet; a temperature sensor configured to detect a temperature; a photosensitive drum;
a charger configured to charge a surface of the photosensitive drum; a developing roller configured to supply developer to an electrostatic latent image formed on the photosensitive drum to form a developer image;
a transfer roller configured to transfer the developer image onto the sheet conveyed by the first conveyance roller;
a heating roller configured to fix the developer image transferred by the transfer roller onto the sheet;
a second conveyance roller configured to convey the sheet passed through the heating roller toward a sheet discharge tray by rotating in a first direction, and convey the sheet passed through the heating roller toward the first conveyance roller by rotating in a second direction opposite to the first direction;
a first motor configured to drive the second conveyance roller and to switch a rotating direction of the second conveyance roller in one of the first direction and the second direction;
a second motor configured to drive the photosensitive drum and the developing roller;
and
a controller configured to control the charger, the first motor, and the second motor, including:
maintaining the first motor in an on state in which the first motor rotates the second conveyance roller in the second direction;
turn off the second motor to stop driving the photosensitive drum and the developing roller after completion of transferring the developer image onto the sheet by the transfer roller;
maintaining the second motor in an off state while the first motor is in the on state;
turn off the charger after an expiration of a time period and after the sheet is discharged from the image forming unit until the sheet is re-conveyed to the image forming unit, from when the second motor is turned off and while the second motor is still in the off state; and
maintaining the charger in an off state while the first motor is in the on state and while the second motor is in the off state,
wherein the controller sets the time period, starting when the second motor is turned off and ending when the charger is turned off, to a first amount of time when the temperature detected by the temperature sensor is equal to or lower than a first temperature, and
wherein the controller sets the time period to a second amount of time that is longer than the first amount of time when the temperature detected by the temperature sensor is higher than the first temperature.

* * * * *